Feb. 3, 1959 E. A. VERRINDER 2,871,773
CRATE LINING MACHINE
Filed March 27, 1953 17 Sheets-Sheet 3
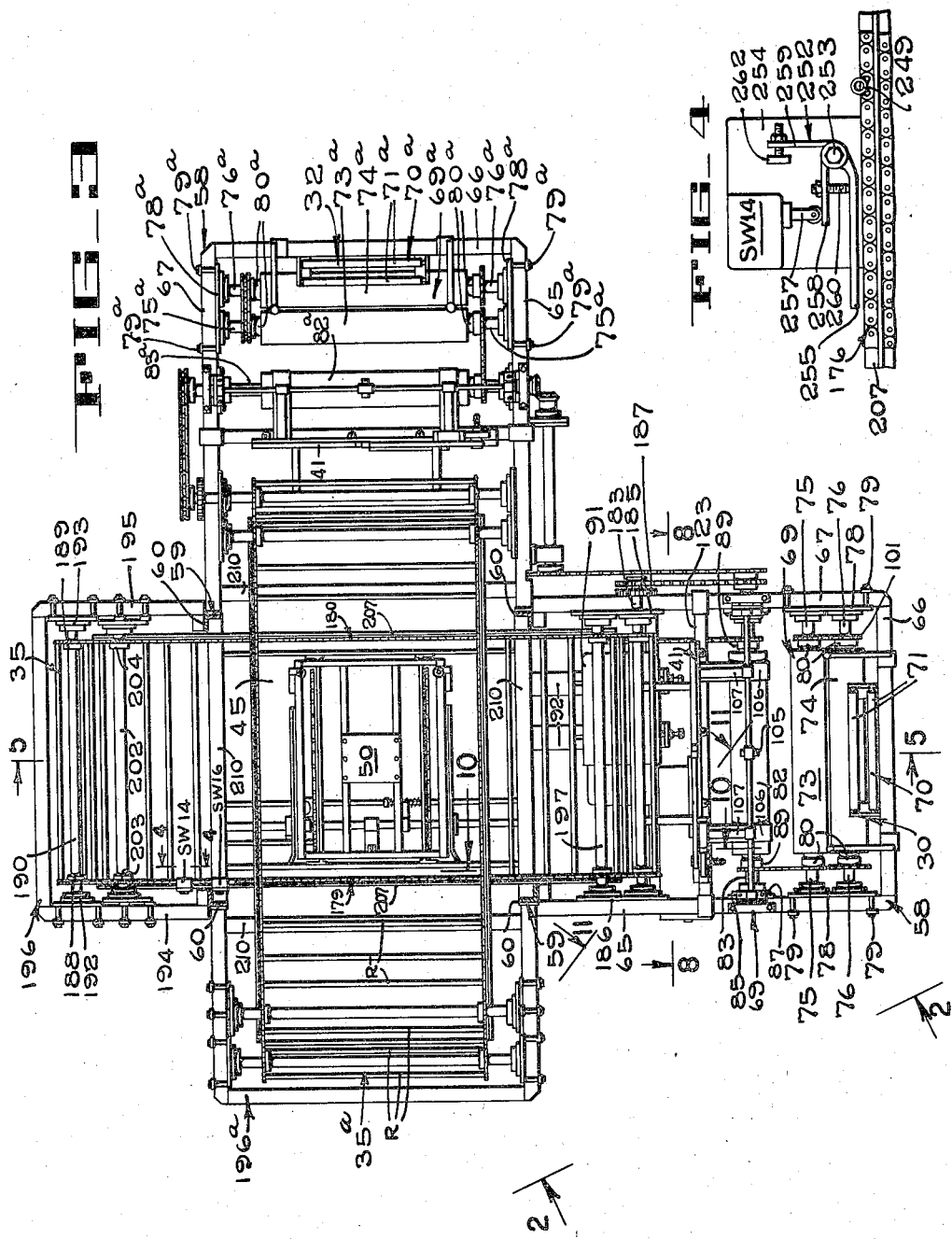
INVENTOR
ERNEST A. VERRINDER
BY Hans G. Hoffmeister
ATTORNEY

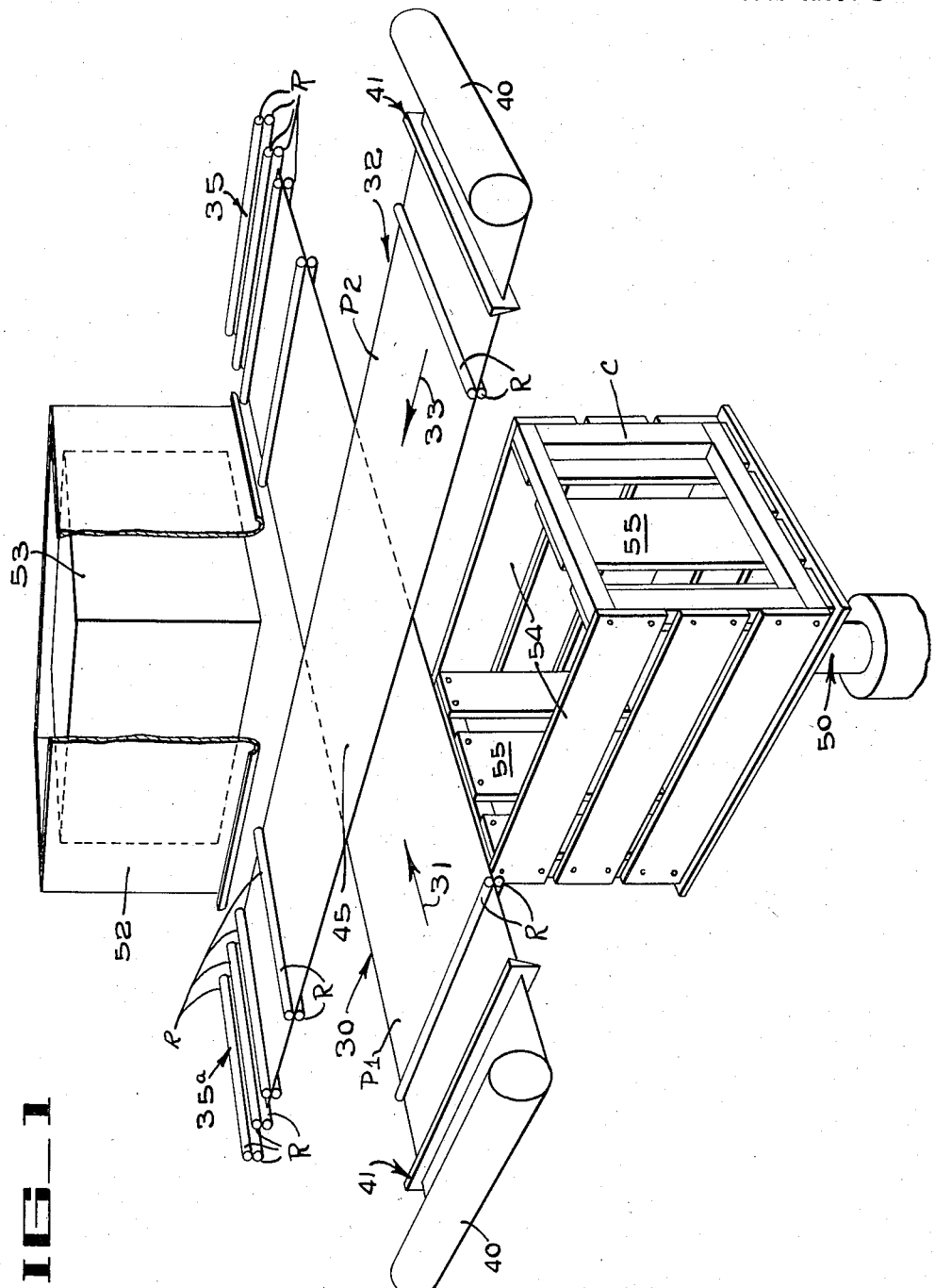

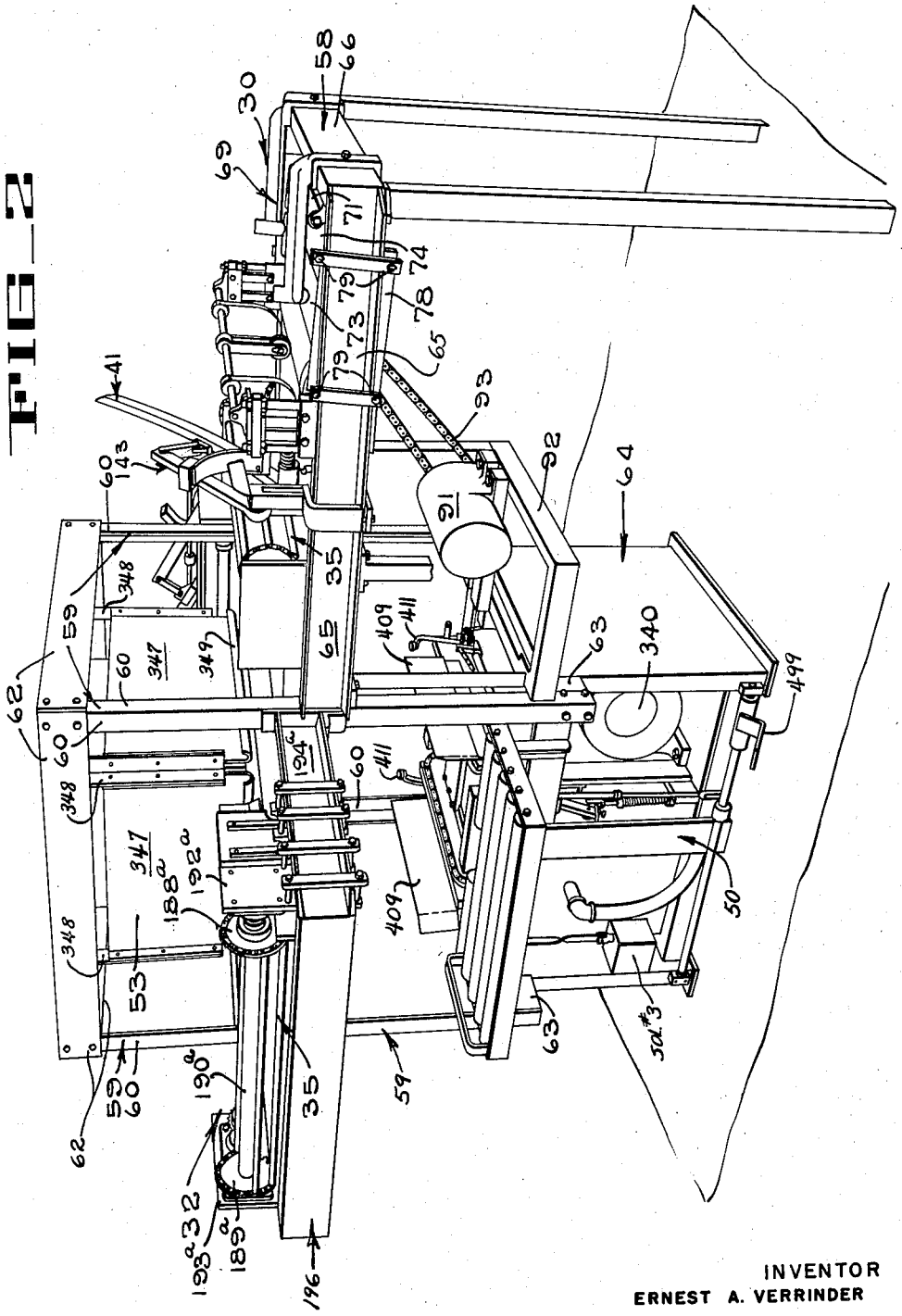

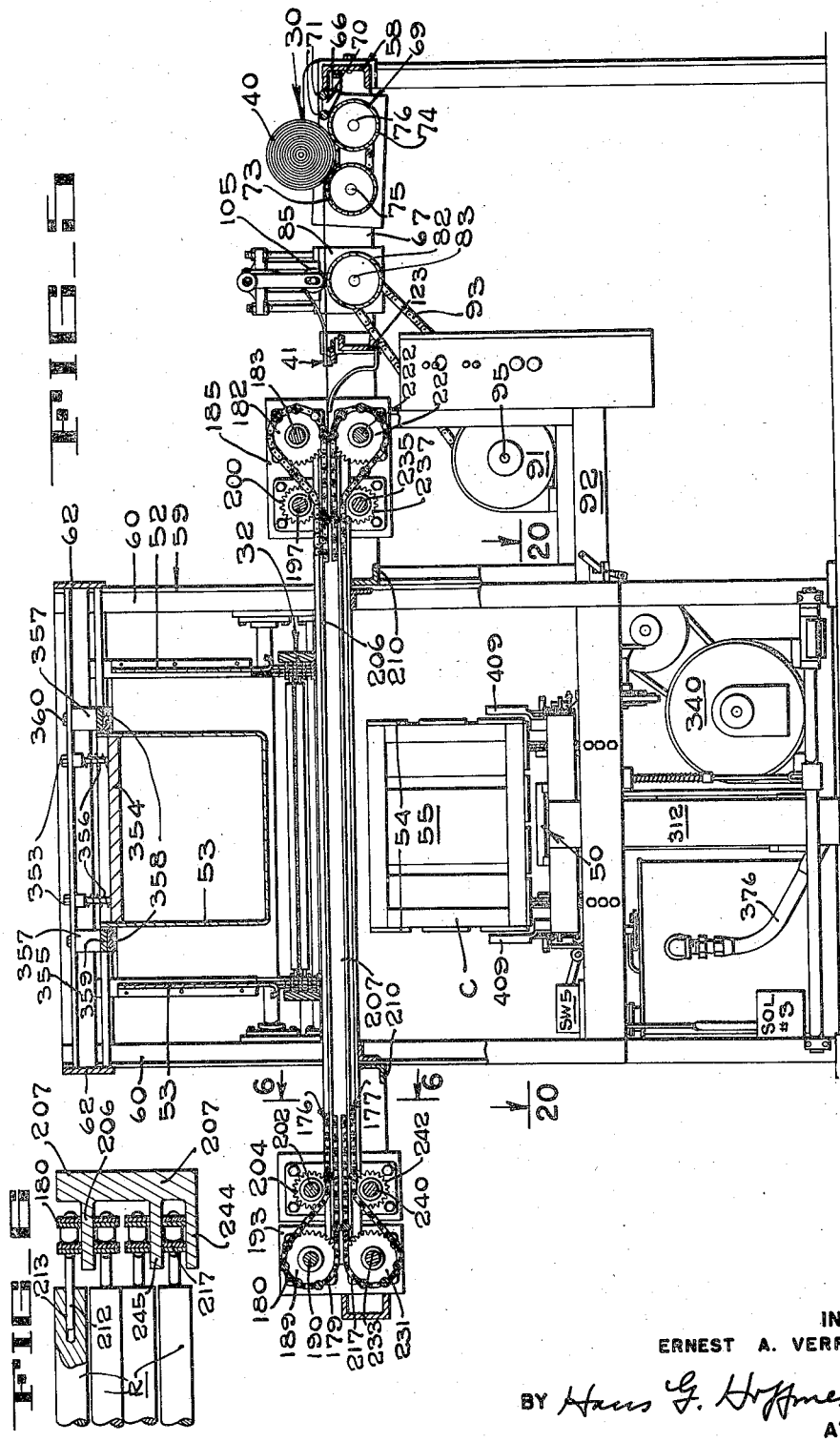

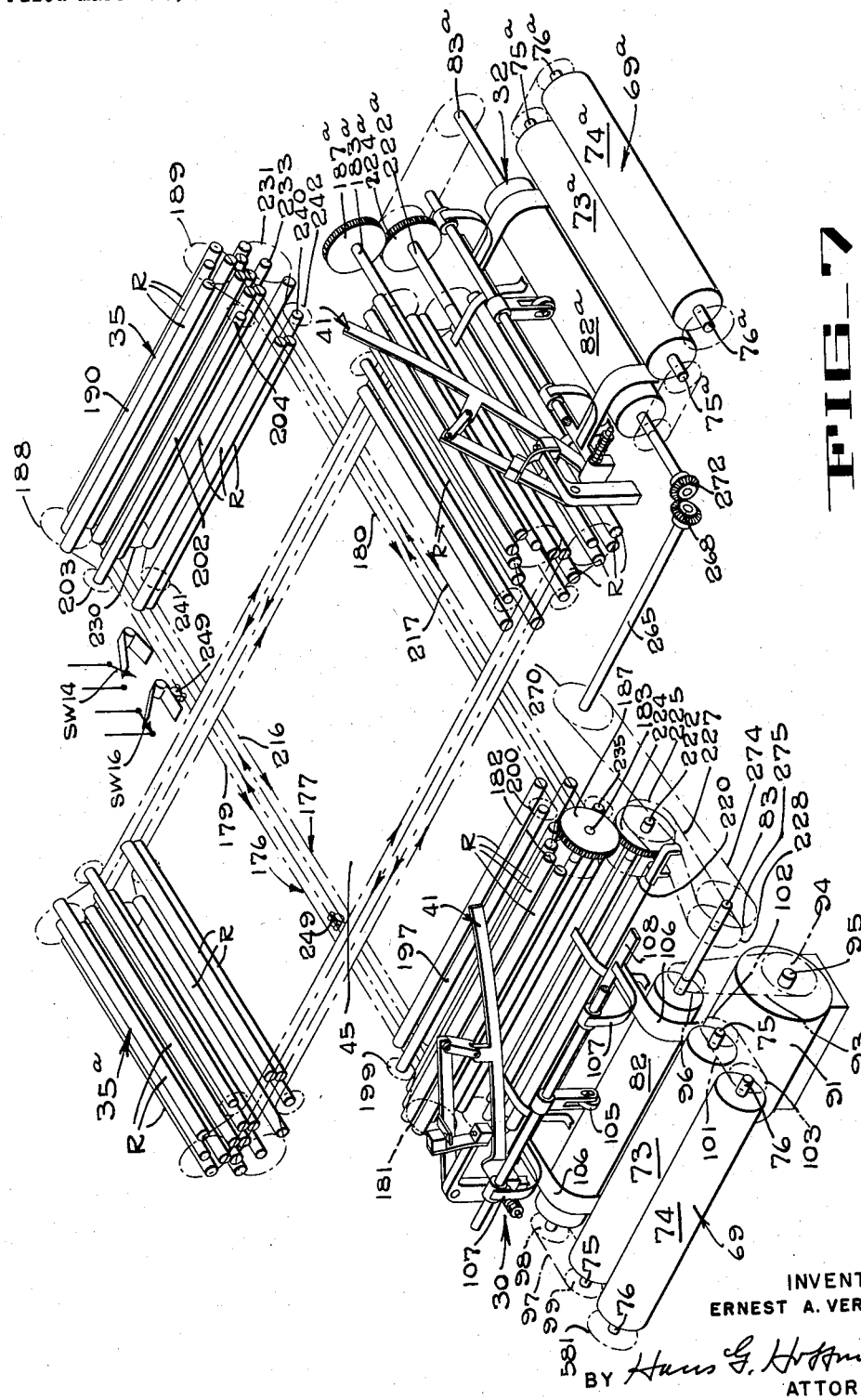

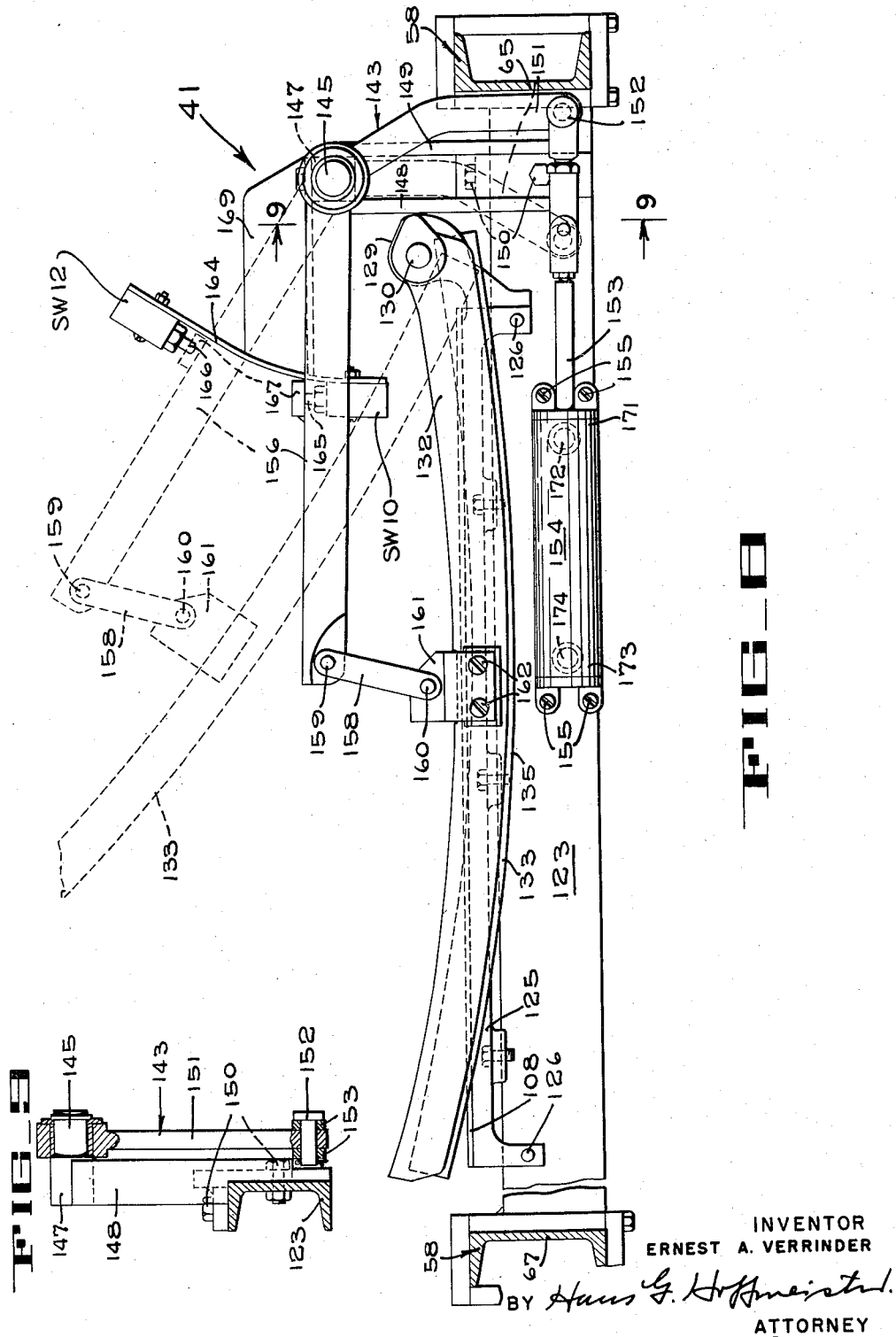

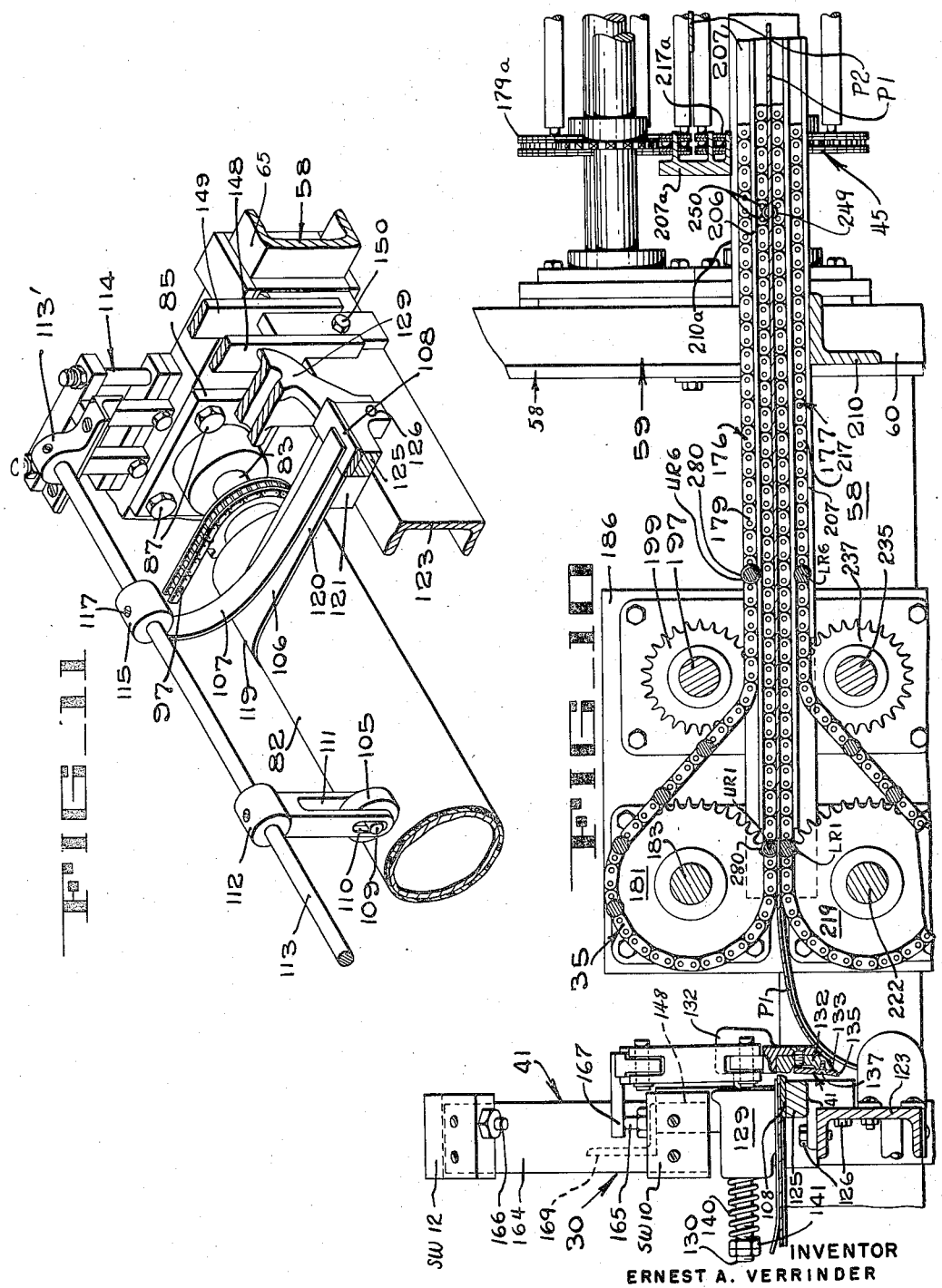

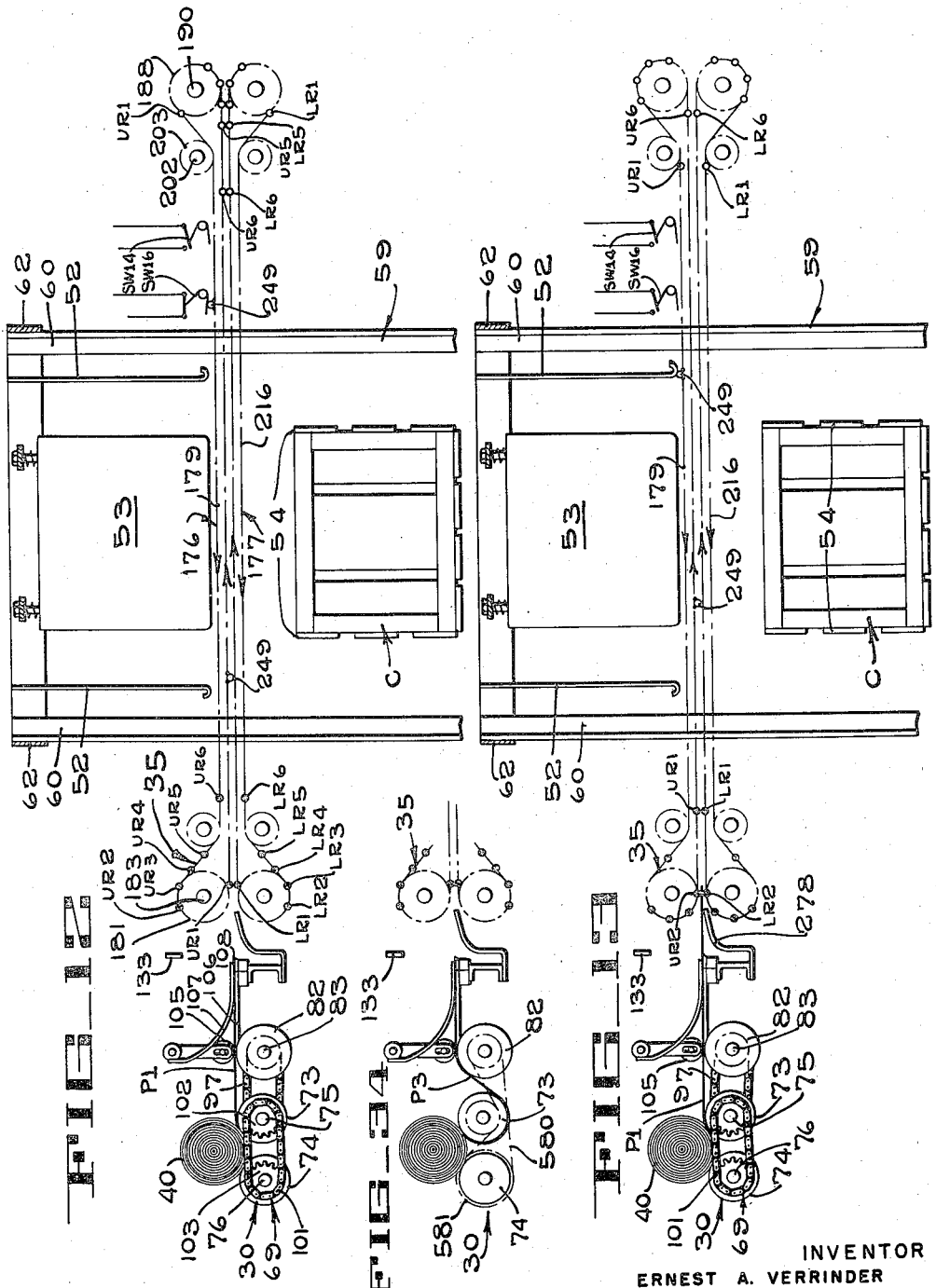

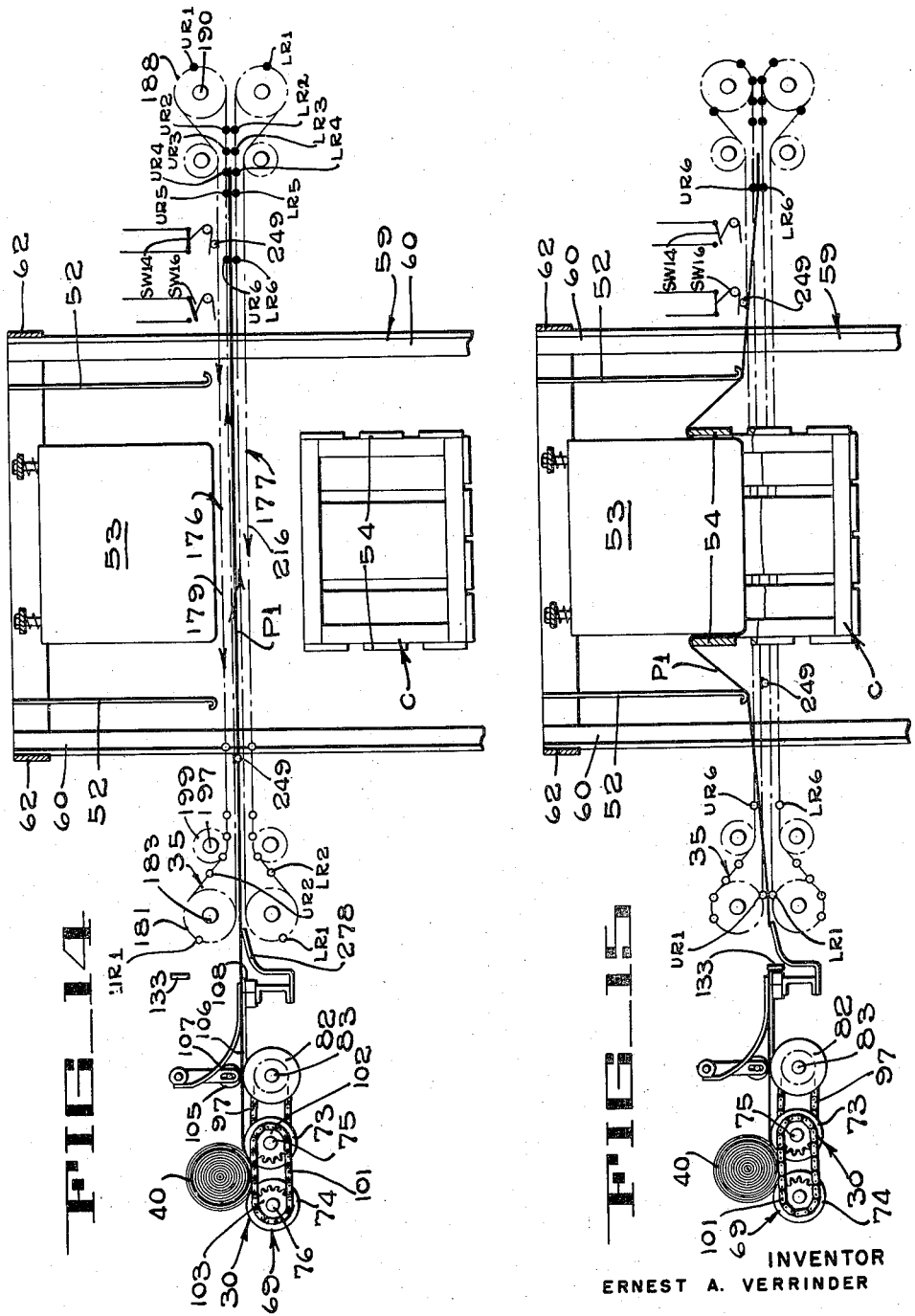

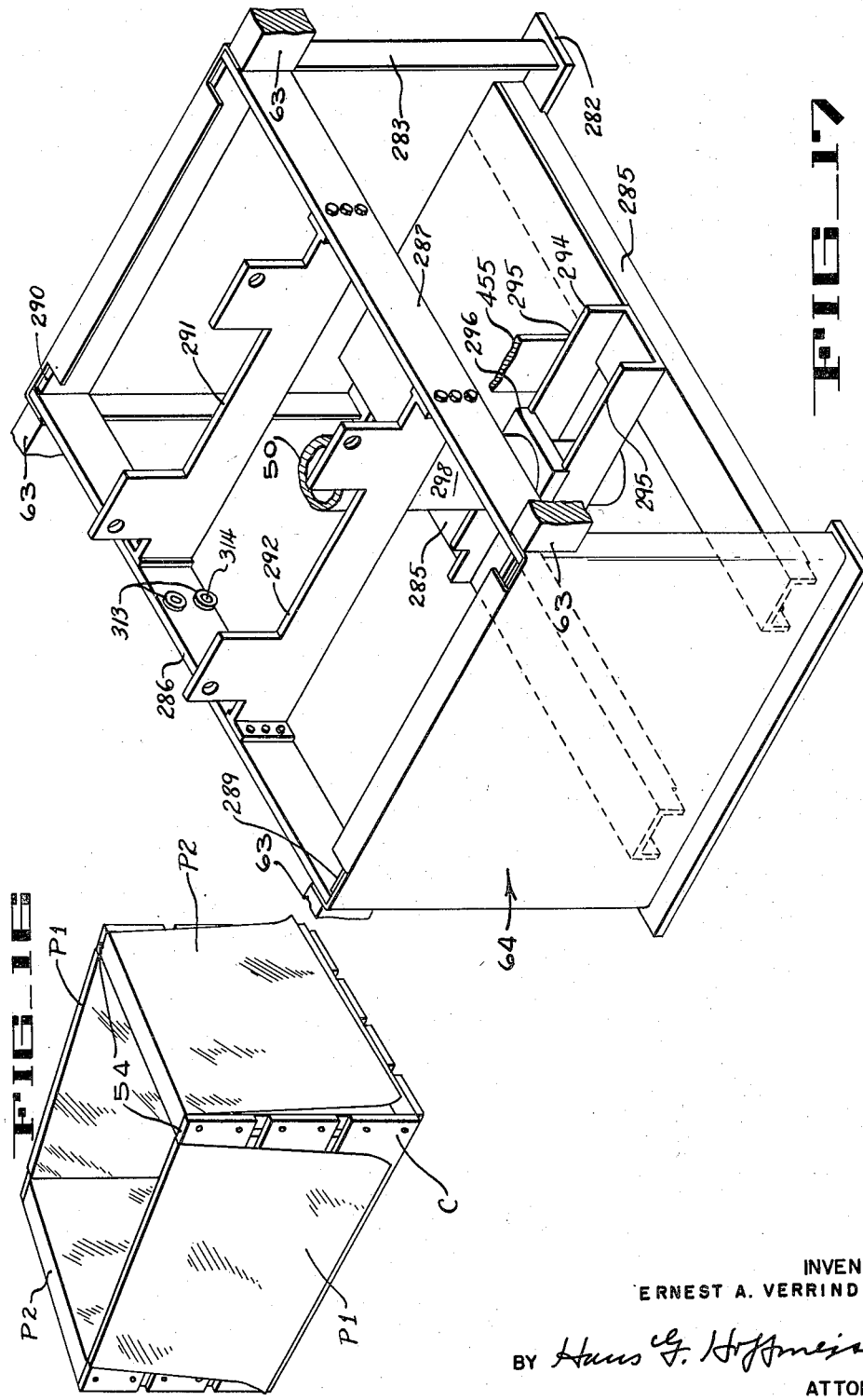

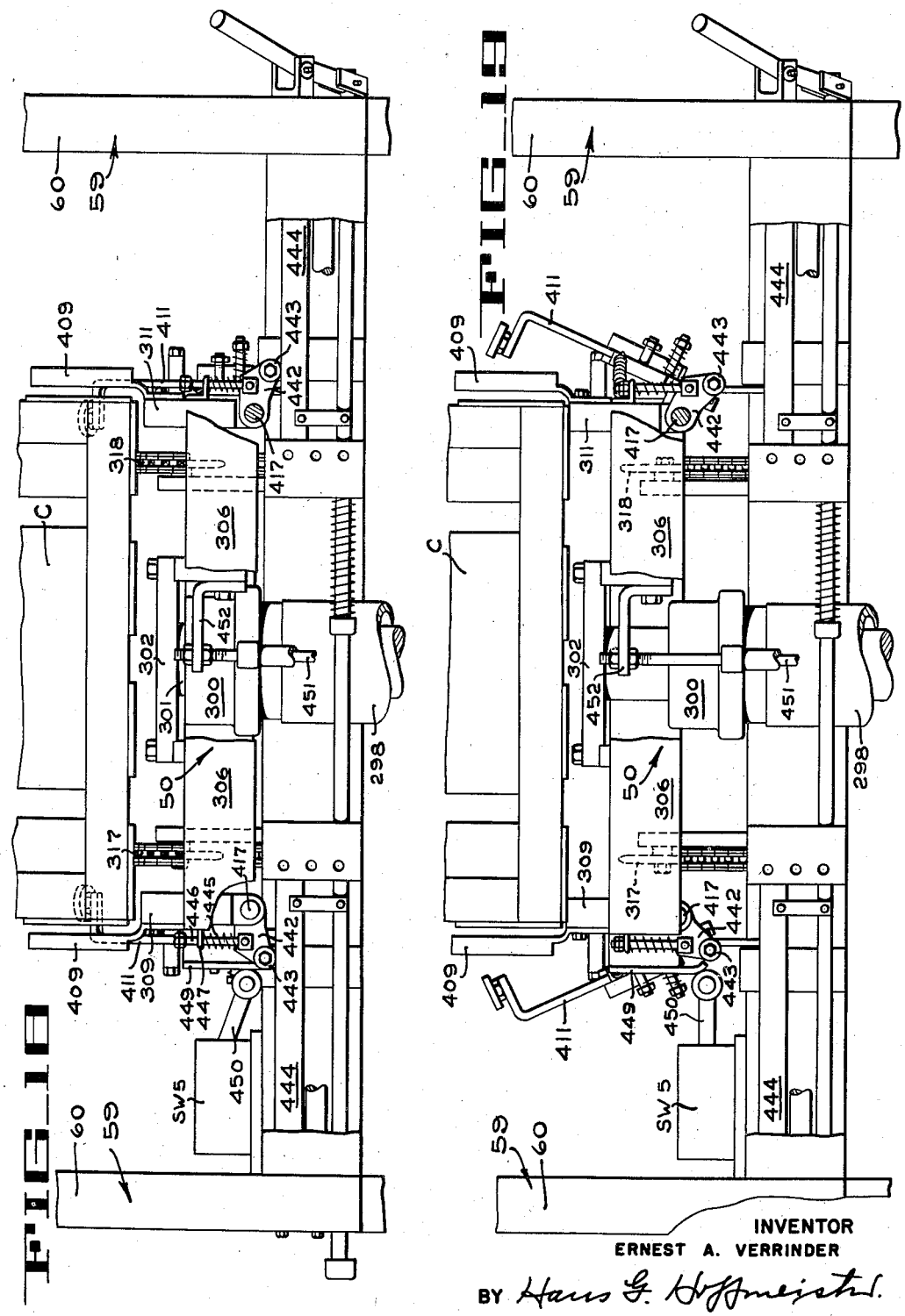

Feb. 3, 1959 E. A. VERRINDER 2,871,773
CRATE LINING MACHINE
Filed March 27, 1953 17 Sheets-Sheet 12
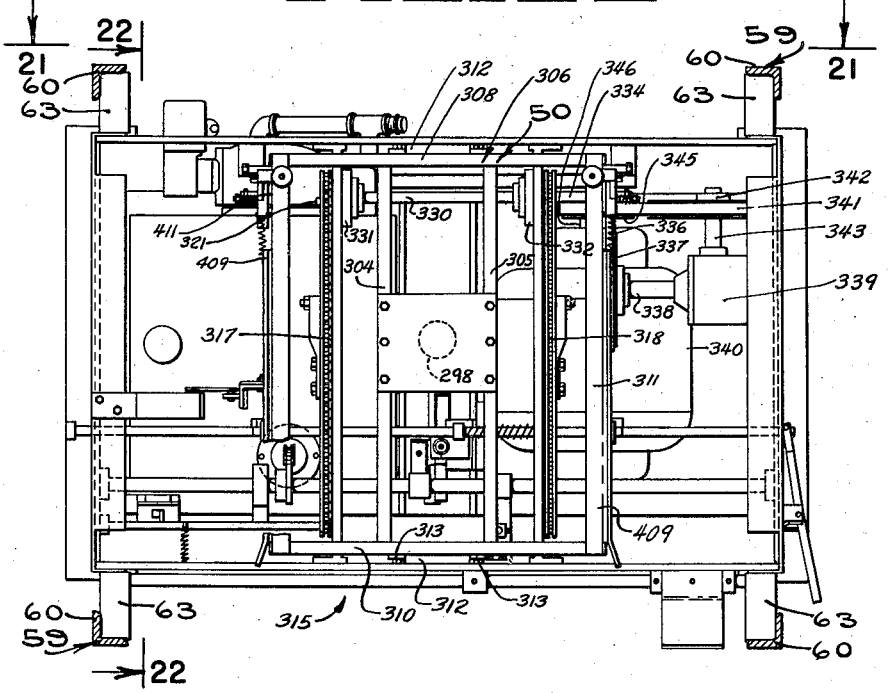
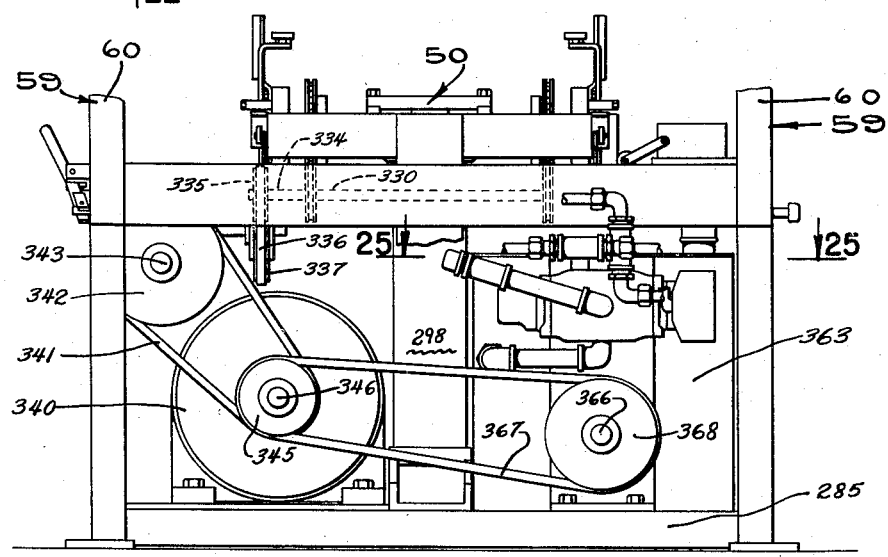
INVENTOR
ERNEST A. VERRINDER
BY Hans G. Hoffmeister
ATTORNEY

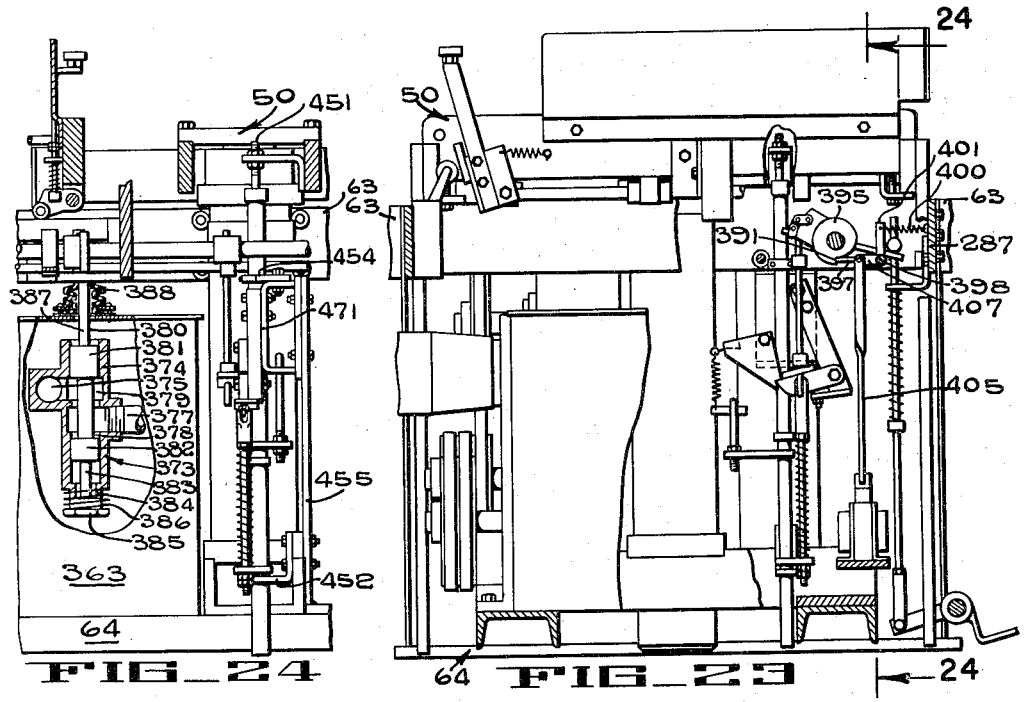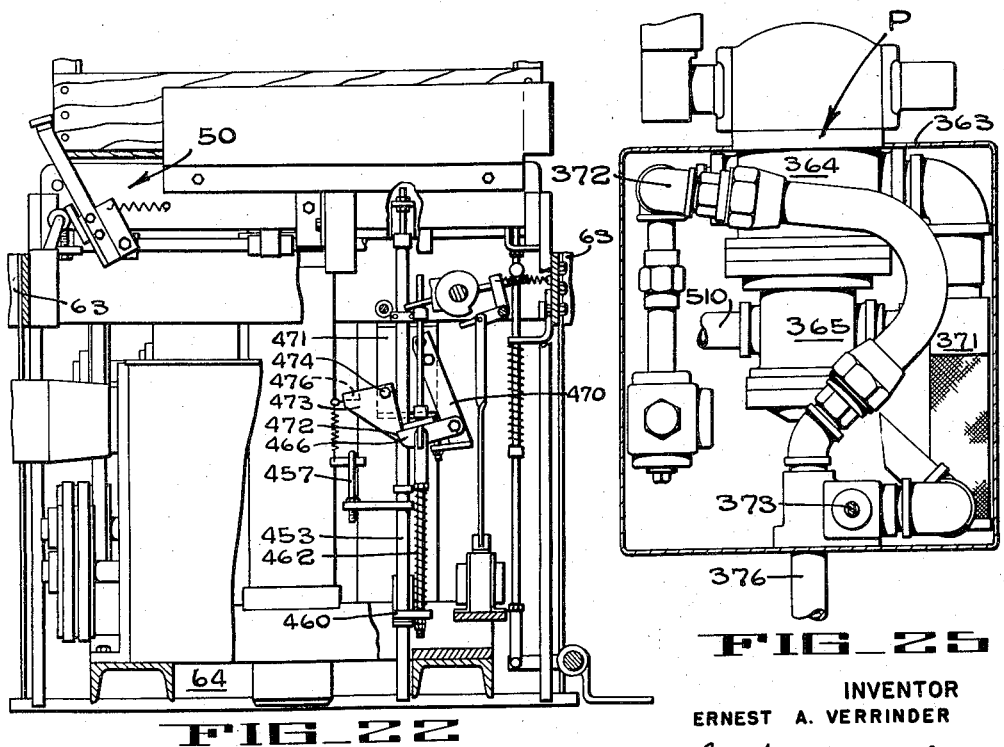

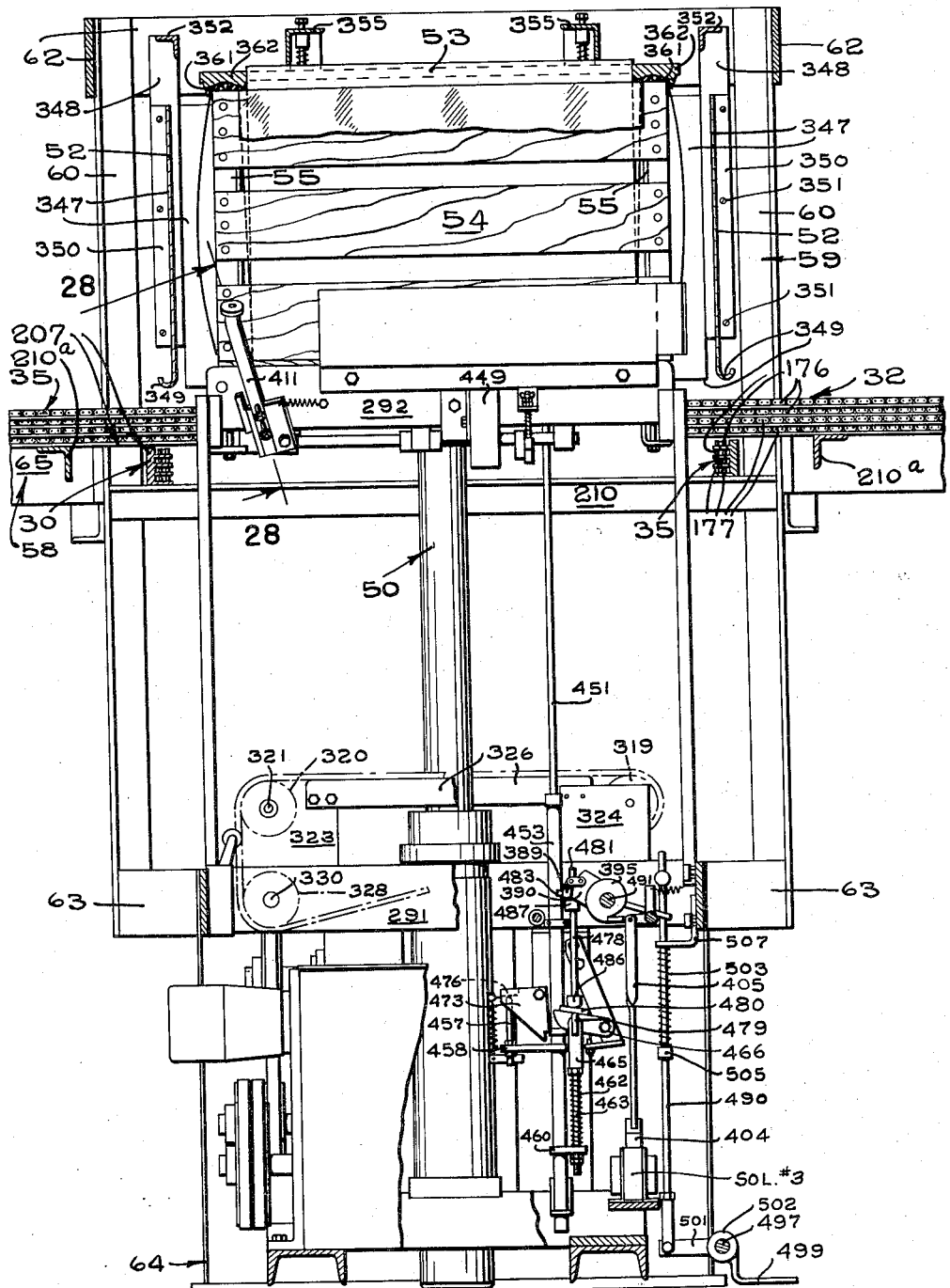

Feb. 3, 1959  E. A. VERRINDER  2,871,773
CRATE LINING MACHINE
Filed March 27, 1953  17 Sheets-Sheet 15
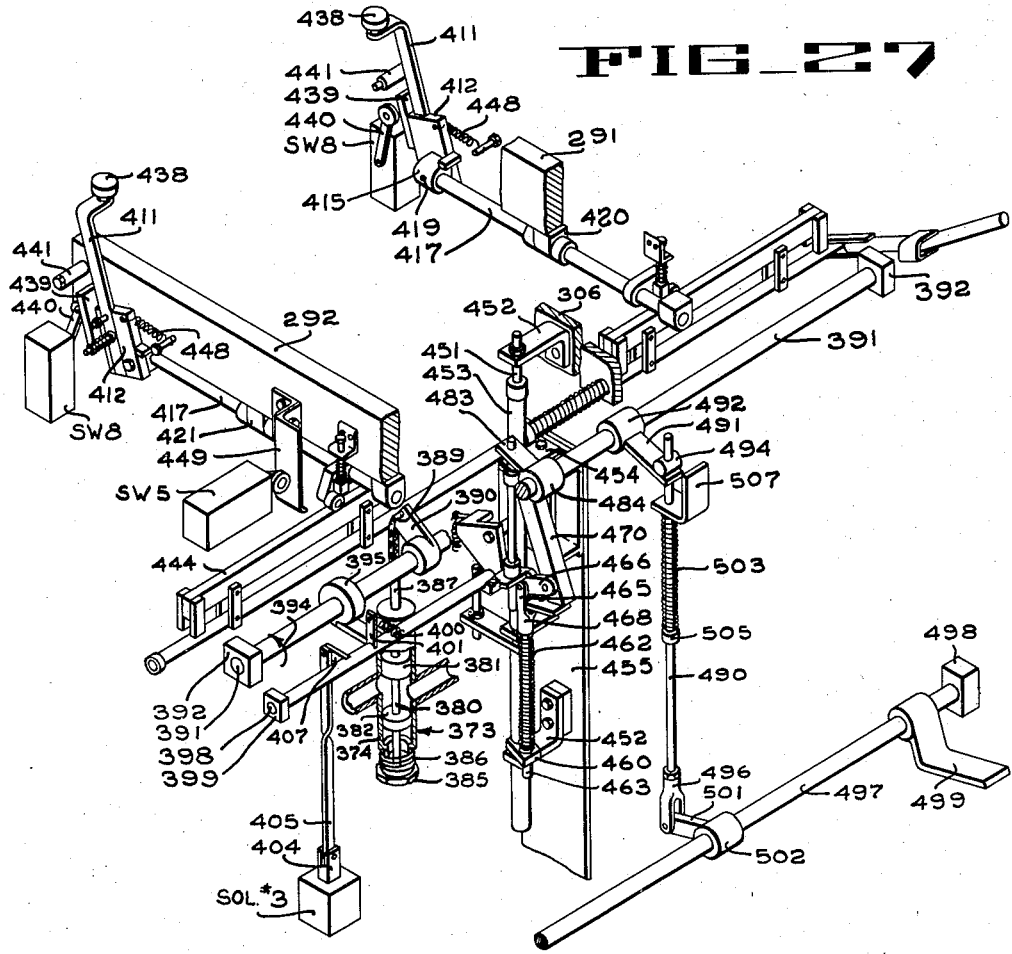
FIG_27
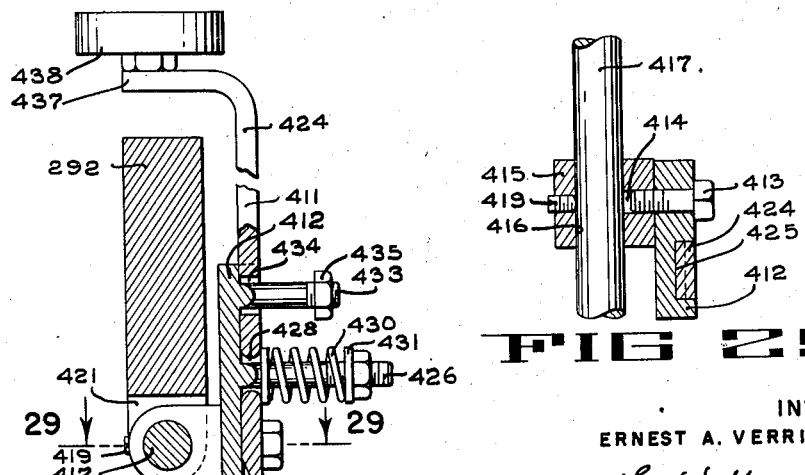
FIG_28
FIG_29
INVENTOR
ERNEST A. VERRINDER

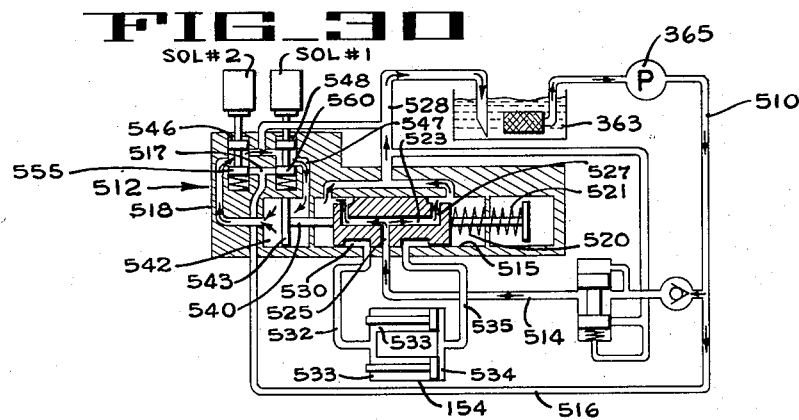
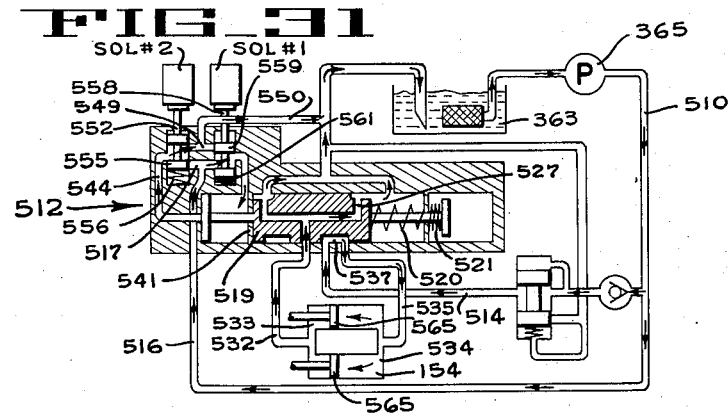
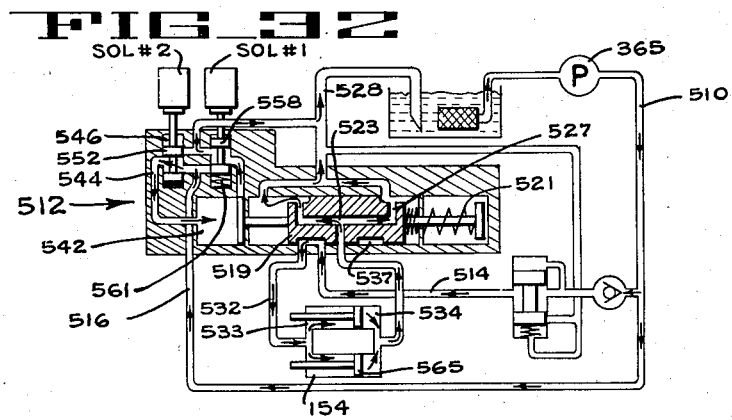
INVENTOR
ERNEST A. VERRINDER
ATTORNEY

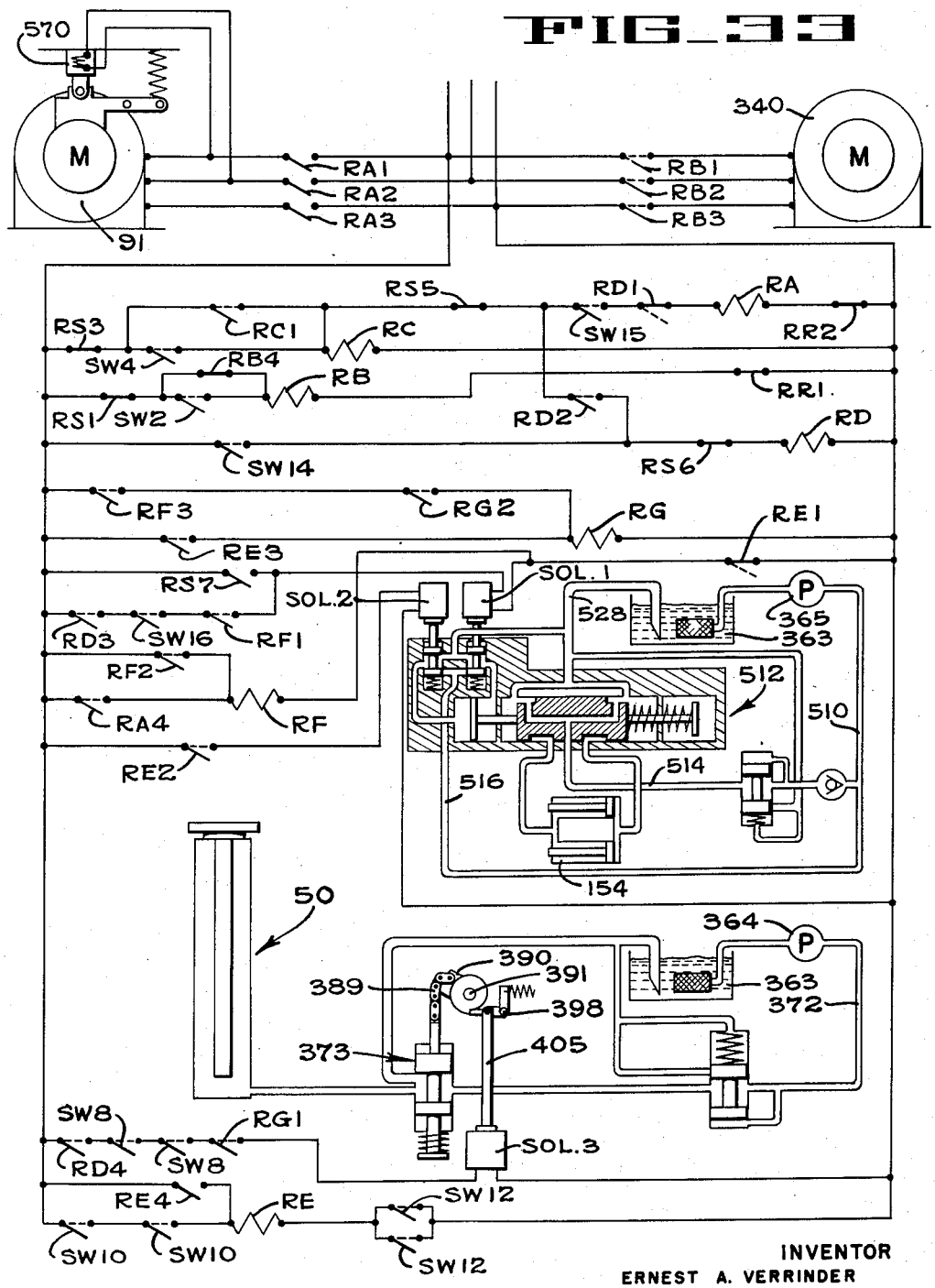

United States Patent Office 2,871,773
Patented Feb. 3, 1959

2,871,773
CRATE LINING MACHINE

Ernest A. Verrinder, Riverside, Calif., assignor to Food Machinery and Chemical Corporation, San Jose, Calif., a corporation of Delaware Application March 27, 1953, Serial No. 345,016

18 Claims. (Cl. 93—36.01)

This invention pertains to a machine for placing a lining of paper, aluminum foil, or the like in a container and more particularly relates to an improved machine for automatically lining the inside walls of an open top crate in which fruit or vegetables are to be packed and in which extensions of the liner are to be used as a covering for the contents of the box.

An object of this invention is to provide an improved mechanism for feeding the lining material from a supply roll, positioning it in the crate lining machine, and cutting it into desired lengths.

Another object is to provide an efficient mechanism for pressing a liner of metallic foil firmly into position in an open top crate.

Another object is to provide a novel mechanism for automatically controlling the sequence of steps in a cycle of operations of the improved crate-lining machine of the present invention.

Other and further objects and advantages of the present invention will become apparent from the following description taken in connection with the accompanying drawings, in which:

Fig. 1 is schematic perspective of the crate-lining machine of the present invention.

Fig. 2 is a perspective of the crate-lining machine.

Fig. 3 is a plan of the crate-lining machine with the upper frame structure removed to illustrate the hoist mounted therein.

Fig. 4 is a vertical section taken along line 4—4 of Fig. 3.

Fig. 5 is a vertical section taken along line 5—5 of Fig. 3.

Fig. 6 is a vertical section taken along line 6—6 of Fig. 5.

Fig. 7 is a perspective of the paper feeding and cutting mechanisms of the crate-lining machine with parts shown schematically to more clearly disclose the mechanism.

Fig. 8 is a vertical section taken along line 8—8 of Fig. 3.

Fig. 9 is a vertical section taken along line 9—9 of Fig. 8.

Fig. 10 is a vertical section taken along line 10—10 of Fig. 3.

Fig. 11 is a fragmentary perspective view, with parts broken away, taken in the direction of arrows 11—11 of Fig. 3.

Figs. 12, 13, 14 and 15 are a series of schematic operational views illustrating successive steps in the feeding, conveying and cutting a length of lining material.

Fig. 16 is a perspective view of a crate after a lining has been placed therein by the crate lining machine of the present invention.

Fig. 17 is a fragmentary perspective of the frame structure of the base of the crate lining machine.

Fig. 18 is a fragmentary elevation of the front of the crate-lining machine, with parts broken away to disclose a portion of the hoist control mechanism.

Fig. 19 is a fragmentary elevation identical to Fig. 18 but showing the parts in a different operational position.

Fig. 20 is a horizontal section taken along line 20—20 of Fig. 5.

Fig. 21 is a fragmentary rear elevation of the crate-lining machine taken in the direction of arrows 21—21 of Fig. 20.

Fig. 22 is a vertical section with parts broken away, taken along line 22—22 of Fig. 20, showing the hoist in its lowered position.

Fig. 23 is a vertical section, similar to Fig. 22 but showing a different operational position of the control mechanism.

Fig. 24 is a vertical section taken along line 24—24 of Fig. 23.

Fig. 25 is a horizontal section taken along line 25—25 of Fig. 21.

Fig. 26 is a vertical section similar to Figs. 22 and 23 but illustrating the hoist and the hoist controls in the positions they assume when the crate is fully elevated.

Fig. 27 is a fragmentary schematic perspective of the hoist control mechanism shown detached from the crate-lining machine.

Fig. 28 is a vertical section taken along line 28—28 of Fig. 26.

Fig. 29 is a horizontal section taken along line 29—29 of Fig. 28.

Figs. 30, 31 and 32 are diagrammatic views of the hydraulic control system used on the crate-lining machine, illustrating successive control operations.

Fig. 33 is a diagram of the combined electrical and hydraulic control systems of the crate-lining machine of the present invention.

Fig. 34 is a fragmentary schematic operational view of an alternate feed mechanism.

The crate lining machine of the present invention is diagrammatically illustrated in Fig. 1 and comprises a first paper feeding and cutting mechanism 30 arranged to advance a length of crate-lining paper P1 in the direction indicated by the arrow 31, and a second paper feeding and cutting mechanism 32 arranged to advance a length of paper P2 in the direction indicated by the arrow 33, the movement of length P2 being at right angles to the direction of movement of length P1. Each mechanism is provided with a power-driven endless chain conveyor 35, partially shown in Fig. 1, extending across the machine and having a plurality of opposed upper and lower carrier rods R which grip the leading portion of the length of paper and carry it a predetermined distance across the machine as the paper is unwound from a supply roll 40. When the desired length of paper has been unwound, the conveyor is automatically stopped and a knife 41 is forced downwardly across the paper to sever the length of paper from the roll and leave the severed length suspended between the rods. The endless chain conveyor of feeding mechanism 30 is disposed at a slightly lower level than the chain conveyor of feed mechanism 32 so that a portion of the length of paper P1 is disposed below the corresponding portion of length P2 at a central zone 45 where the lengths overlap. When the lengths of paper have been cut and are held in overlapping stationary position, an empty vegetable crate C, which has been accurately positioned on a power hoist 50 immediately below and in alignment with the zone 45, is raised upwardly. In its upward movement the crate C contacts the lower surfaces of the paper lengths P1 and P2 and lifts the lengths upwardly, drawing the trailing edges from the retaining rods which yieldingly rotate and permit the paper to be pulled upwardly. As the crate continues upwardly, the side walls of the crate move into a space defined between the inner surface of the walls of a stationary frame member 52 and the outer surface of the walls of a central stationary former 53. The rounded bottom edges of the former 53 press the overlapping portions of the lengths of paper liners P1 and P2 down to the bottom of the crate C while the bottom edges of the frame member 52 guide the paper liners inwardly toward the side walls of the crate. When the liners have been firmly pressed down into the crate, producing a lined crate in finished form substantially as shown in Fig. 16, the upward movement of the hoist is automatically stopped and the hoist is then permitted to descend by gravity to its lowermost position. The lined crate is then removed from the hoist, an unlined crate is positioned on the hoist, and the crate-lining cycle is repeated.

It will be understood that the width of the paper liner P1 is less than the width of the opposite side walls 54 of the crate C by an amount sufficient to permit the liner to be pressed down into the crate with a minimum of interference with side walls 55 of the crate. Correspondingly, the width of the paper length P2 is less than the width of the crate side walls 55. Accordingly, if the crate is longer than it is wide, one length or liner will be wider than the other length.

In the plan shown in Fig. 3, it will be seen that the paper feeding and cutting mechanisms 30 and 32 are mounted on separate frame support structures 58 which extend laterally from a central upright frame structure 59 formed by four spaced upright angle bars 60. The bars 60 are secured together in mutually bracing relation at their upper ends by cross-braces 62 (Fig. 2) and, at their lower ends, by connection through blocks 63 (Fig. 2) to a rigid base 64 in which the hoist 50 is mounted. Each of the feed mechanism support structures 58 is formed of structural steel channels 65, 66 and 67 (Fig. 3) which are suitably secured together and have their webs disposed in vertical positions.

The paper feeding and cutting mechanisms 30 and 32 are identical with the exception, as mentioned above, that the endless chain conveyor 35 of feed mechanism 30 is disposed at a slightly lower level than the endless chain conveyor 35 of feed mechanism 32. This relative displacement of the conveyor chains is accomplished by mounting the guide channels, in which the chains of one conveyor slide, at a different level than the level of the guide channels for the chains of the other conveyor, as will be explained presently. Since the two paper feeding and cutting mechanisms are identical, a detailed description of the feeding and cutting mechanism 30 will serve to disclose the operation of the mechanism 32 also. Further, to more clearly show the indenticalness of the two mechanisms; the parts of mechanism 32, that are identical to parts in mechanism 30, are given the same reference numeral followed by a suffix "a."

The paper feeding and cutting mechanism 30 (Fig. 3) comprises a paper storing and threading section 69, a knife assembly 41, and an endless chain conveyor 35. The storing and threading section includes a support unit 70 of freely rotatable rollers 71, which unit is mounted in horizontal position on the frame channel member 66 to provide a temporary support for the roll of paper 40 (Fig. 5) as it is being initially threaded into the machine. During normal operation of the machine, the supply roll 40 rests on two adjacent feed rollers 73 and 74 (Figs. 3 and 7) which are of the same diameter and are supported on shafts 75 and 76, respectively. At their ends the shafts 75 and 76 are rotatably journalled in bearing plates 78 (Fig. 3) secured to the inner surface of the frame channel members 65 and 67 by bolts 79. Each feed roller 73 and 74 is a hollow steel cylinder accurately ground to size and covered with a suitable plastic material having a high coefficient of friction. The feed rollers are mounted on the shafts 75 and 76 by hub members 80 which extend outwardly at each end of the rollers and are rigidly connected to the inner surface of the cylindrical rollers by spider members (not shown) or their equivalent, in a well-known manner. A tension roller 82 (Figs. 3 and 7) is mounted forwardly, in the direction of paper travel, from the feed roller 73 on a shaft 83 that is journalled for rotation in bearing plates 85 (Fig. 11) secured to the inner surface of the frame channel members 65 and 67 by bolts 87. The shaft 83 is parallel to the shafts 75 and 76 and is disposed substantially in the same horizontal plane. The tension roller 82 is a hollow steel cylinder of slightly larger diameter than the feed rollers 73 and 74 and is also provided with a plastic outer covering which has a high coefficient of friction. Hubs 89 (Fig. 3) to which the tension roller 82 is secured by suitable spider members (not shown), extend outwardly from each end of the roller 82 in keyed engagement with the shaft 83. The tension roller 82 is driven by an electric motor 91 (Figs. 3 and 5) that is secured to a support structure 92 attached to the upright central frame structure 59. A chain 93 (Fig. 7) is trained around a sprocket 94 keyed to a power shaft 95 of the motor 91 and around a sprocket 96 which is keyed to the shaft 83 of the tension roller 82. The tension roller 82, in turn, drives the feed roller 73 by means of a chain 97 trained around a sprocket 98 keyed to the shaft 83 and a sprocket 99 keyed to the feed roller shaft 75. In order that both feed rollers 73 and 74 be driven simultaneously, a chain 101 is trained around a sprocket 102 keyed to the shaft 75 and a sprocket 103 keyed to the shaft 76 to which the feed roller 74 is keyed.

Referring to Fig. 5, it will be seen that the paper supply roll 40 rests on the positively driven feed rollers 73 and 74. When the motor 91 is energized the paper is fed forwardly between the tension roller 82 and a pressure wheel 105 and between stationary plates 106 (Fig. 11) and curved guide straps 107. While passing through the knife assembly 41, the paper rests on an anvil or shearing block 108. Since the tension roller 82 is slightly larger in diameter than the feed rollers 73 and 74, its surface speed will be greater and the paper will be held in a tensioned condition between the feed roller 73 and the tension roller 82.

The pressure wheel 105, which is best shown in Fig. 11, is supported by axially projecting pins 109 which are freely mounted in elongated vertical slots 110 in the bifurcated lower end of an upright support bar 111. The bar 111 has a tubular hub 112 which is keyed to a rod 113 that is disposed directly above and parallel to the tension roller 82 and is supported at its ends in bearing blocks 113' mounted on pedestals 114 secured to the side channel members 65 and 67 of the frame support structure. Each curved guide strap 107 is secured to a hub 115 which is adjustably mounted on the rod 113 by a set screw 117. The clearance between the shearing block 108 and each guide strap 107 may be varied by loosening the set screw and rotating the strap. A stationary plate 106 is mounted directly under each guide strap 107. The plate 106 has a curved rearward end portion 119, that is formed to fit close to the surface of the tension roller 82, and a flat forward end portion 120 secured to a block 121 that is mounted on a heavy structural channel 123 extending between the side channel members 65 and 67.

The knife assembly 41 of the feeding and cutting mechanism 30 comprises a support bar 125 (Figs. 8 and 10) that is secured by bolts 126 to the top surface of the transverse structural channel 123. The shearing block 108 is secured to the top surface of the support bar 125 by capscrews. The bar 125 has an upwardly extending ear 129 at one end in which a pivot shaft 130 (Fig. 10) is rotatably journalled. The shaft 130 is secured to and projects at right angles away from one end of a blade holder 132 (Fig. 10) to swingably mount the blade holder on the upstanding ear 129 of the shearing block support bar 125. An elongated blade 133 (Fig. 8) having a curved lower cutting edge 135 is secured at spaced intervals along its length to the blade holder 132 by a plurality of set screws 137, one only being shown in Fig. 10. The blade is urged toward the cutting edge of the shearing block by a coil spring 140 (Fig. 10) disposed around the shaft 130 between lock nuts 141 on the threaded end of the shaft and one face of the upstanding ear 129.

Raising and lowering of the blade is effected through a lever system including a bellcrank 143 (Fig. 8) which is pivotally mounted on a laterally projecting pin 145 (Figs. 8 and 9) integrally formed on a block 147 which is secured between the upper ends of two spaced upstanding support posts 148 and 149 (Fig. 8). The posts are rigidly secured by bolts 150 (Fig. 9) to the transverse structural channel 123 and are positioned directly behind the upstanding ear 129 (Fig. 10) on which the blade holder 132 is pivoted. One arm 151 (Fig. 8) of the bellcrank 143 is pivotally connected at 152 to the end of a piston rod 153 extending from a conventional double-acting hydraulic power cylinder 154 which is secured by bolts 155 to the web of the channel 123. The other arm 156 of the bellcrank 143 extends outwardly over the blade holder 132 and is arranged to swing in the same vertical plane as the blade holder to which it is connected by a link 158. The link 158 has forked ends one of which is pivotally connected at 159 to the outer free end of the bellcrank arm 156, the other end being pivotally connected by a pin 160 to a rigid connector plate 161 which is secured to the blade holder 132 by countersunk capscrews 162. A pair of microswitches SW10 and SW12 (Fig. 8) are mounted on a support strap 164 alongside the bellcrank arm 143. The switches which are normally open have plungers 165 and 166, respectively, disposed to be actuated by a contact plate 167 welded to and projecting outwardly from the bellcrank arm 156. The switch support strap 164 is mounted at the outer end of an angle bar 169 (Fig. 10) which is welded to the top surface of the upstanding support posts 148 and 149. It will now be evident that, when fluid is directed to one end 171 (Fig. 8) of the hydraulic power cylinder 154 through a port 172, the blade 133 will be raised through the pivoting movement of the bellcrank 143 and, when fluid is directed to the other end 173 of the cylinder through a port 174, the blade will be positively moved downwardly to sever the paper between the cutting edge of the blade and the sharpened edge of the shear block. Also, it will be recognized that, at the upper end of its swing, the contact plate 167 on the blade will move the switch SW12 to closed position and hold it there and, at the lower end of its swing, the contact plate will hold the switch SW10 in closed position.

The endless chain conveyor 35 (Fig. 7) comprises an upper endless chain assembly 176 and a lower endless chain assembly 177 which cooperate to carry the leading edge of the length of paper across the machine from the paper feeding section, through the central zone, to the far end of the conveyor where the leading edge is held in a stationary position while the crate C is elevated. The upper endless chain assembly 176 is provided with a pair of laterally spaced chains 179 and 180 (Fig. 3) disposed at each side of the path of travel of the paper. At the feed end of the conveyor, the endless chains 179 and 180 are trained around sprockets 181 and 182, respectively, which are keyed in spaced relation on a drive shaft 183. The shaft 183 is journalled for rotation in two identical bearing plates 185 and 186 which are secured to and project above the side channels of the frame 58 as shown in Figs. 5 and 10. The shaft 183, extends through the bearing plate 185 to receive a gear 187 (Fig. 3) in keyed relation on its outer end. At the far end of the upper conveyor, the endless chains 179 and 180 are trained around spaced sprockets 188 and 189 (Fig. 3), respectively, which are keyed in spaced relation to a transverse idler shaft 190. The shaft 190 is rotatably journalled at its opposite ends in bearing plates 192 and 193 which are mounted in upstanding position on side channel members 194 and 195, respectively, of a support structure 196 projecting outwardly from the central, vertical support structure 59. A transverse idler shaft 197 (Fig. 7) at the feed end of the conveyor is journalled in the bearing plates 185 and 186 and carries spaced guide sprockets 199 and 200 (Fig. 7) which overlie the upper flight of the upper endless chains 179 and 180 while a transverse rotatable idle shaft 202 (Fig. 7) at the far end of the conveyor carries spaced sprockets 203 and 204 which overlie the upper flight of the upper chains 179 and 180 at that end. Throughout the greater part of their length, the upper flight of each of the upper endless chains 179 and 180 is supported on a transverse shelf 206 (Fig. 6) of a chain guide 207, there being two spaced guides 207 (Fig. 3) one for each of the pairs of chain assemblies 176 and 177. The guides 207 are supported on transversely extending angle bars 210 (Fig. 5) which are welded to the central support structure 59.

As previously mentioned, the endless chain conveyor 35 has a plurality of transverse carrier rods R. Referring to Figs. 3 and 12, it will be seen that the rods of the upper endless chains 179 and 180 are divided into two groups of six rods each, the rods in each group being identified as UR1, UR2, UR3, UR4, UR5 and UR6. Each rod is rotatably journalled at each end on a pin 212 (Fig. 6) projecting laterally inwardly from the inside face of the endless chains 179 and 180 into sockets 213 provided in each end of each rod. The rods therefore are rotatably supported between the chains which are held against excessive lateral movement away from each other by the guides 207.

The lower endless chain assembly 177 (Fig. 7) is provided with a pair of spaced chains 216 and 217 disposed immediately below and parallel to the upper chains 179 and 180, respectively. At the feed end of the conveyor, the chains 216 and 217 are trained around sprockets 219 (Fig. 10) and 220 (Fig. 5), respectively, which are keyed in spaced relation on a drive shaft 222. The drive shaft 222 is immediately below and parallel to the drive shaft 183 of the upper chain assembly and is journalled for rotation at each side of the frame in the lower portion of the bearing plates 185 and 186. The shaft 222 extends through the bearing plate 185 and receives in side by side relation a gear 224 and a sprocket 225 (Fig. 7) keyed on its outer end. The sprocket 225 is rotated by a chain 227 which is trained around the sprocket 225 and around a sprocket 228 keyed on the power driven shaft 83. The gear 224 on shaft 222 is in mesh with the gear 187 on the shaft 183 and therefore the shafts are rotated simultaneously.

At the far end of the lower chain conveyor assembly, the endless chains 216 and 217 are trained around spaced sprockets 230 and 231, respectively, which are keyed in spaced relation to a transverse idler shaft 233. The shaft 233 is disposed immediately below the shaft 190 of the upper chain assembly and is rotatably journalled at its opposite ends in the bearing plates 192 and 193 (Fig. 3). A transverse idler shaft 235 (Fig. 5) at the feed end of the conveyor is journalled in the bearing plates 185 and 186 and carries spaced guide sprockets 237 and 238 (Fig. 10), respectively, over which the lower flights of the lower endless chains 216 and 217 are trained. At the far end, a transverse rotatable idler shaft 240, disposed directly below the upper idler shaft 202, carries spaced sprockets 241 and 242 over which the lower flight of the lower endless chain is also trained. The lower flights of the chains 216 and 217 are supported throughout most of their length on shelves 244 (Fig. 6) of the guide members 207 and the upper flight slides along on a shelf 245 immediately above.

The lower endless chain (Fig. 12) is also provided with two groups of six carriers rods R, the rods in each group being designated LR1, LR2, LR3, LR4, LR5 and LR6. These rods are supported and carried by the two chains in exactly the same manner as described in connection with the rods of the upper chain conveyor. Further, the chains are exactly the same length and the rods are so located on the chains that each upper rod will register with and cooperate with a correspondingly numbered lower rod, as for example, each upper rod UR1 will always register with a lower rod LR1.

Referring to Fig. 10, when the leading edge of the paper length P1 passes through the knife assembly, it is grasped between bars R and pulled across the machine. At the central zone 45, the paper length P1 passes below the paper length P2 which is carried across the machine at right angles to P1 between the rods of the feeding and cutting mechanism 32. It is to be noted that the guides 207a which support the chains of the mechanism 32 are mounted on a transverse angle bar 210a at a higher elevation than the guides on which the chains of mechanism 30 are mounted. It will also be noted in Fig. 10 that the upper endless chain 179 of mechanism 30 carries a switch actuator 249 in the form of a roller mounted on outwardly projecting pins 250 of the chain. There are two such switch actuators 249 on the chain 179 and they are positioned to close the contacts of two spaced switches SW14 and SW16 (Figs. 3 and 4). Each switch is actuated through a rocker 252 (Fig. 4) pivotally mounted on a pin 253 projecting laterally from an upstanding plate 254 which is secured, in any suitable manner, to the outer face of the adjacent chain guide 207. The rocker 252 has one arm 255 disposed directly above the path of movement of the switch actuator 249 on the chain. The arm 255 is normally urged to the lower pivoted position shown in Fig. 4, in which the electric contacts of the switch are open, by a spring (not shown) inside the switch. The spring presses a plunger 257 against a lever 258 pivotally mounted on the pin 253. A screw 260, adjustably mounted in the arm 258, bears against the rocker arm 255 to move it downwardly and to move a second arm 259 of the rocker 252 against a stop 262 projecting outwardly from the mounting plate 254. When the rocker 252 is in the downwardly pivoted position, the arm 252 will be contacted by the switch actuator as it moves past the switch thus momentarily closing the contacts to effect a control operation which will be explained hereinafter. Since the switches SW14 and SW16 (Fig. 7) are mounted next to each other directly above the chain 179, it is evident that they will be actuated consecutively by the same switch actuator.

The endless chain conveyor 35a of the paper feeding and cutting mechanism 32 is driven in timed relation with the conveyor 35 of the mechanism 30 by means of a shaft 265 (Figs. 3 and 7) which is rotatably journalled in bearings 266 and carries a bevel gear 268 at one end and a sprocket 270 at the other end. The gear 268 meshes with a similar bevel gear 272 on the drive shaft 83a of the tension roller 82a. The sprocket 270 is connected through a chain 274 to a sprocket 275 keyed on the shaft 83.

In Figs. 12, 13, 14 and 15, a series of consecutive operating positions of the upper and lower endless conveyor chains 176 and 216 of the feeding mechanism 30 is illustrated. In Fig. 12 the positions of the two sets of carrier rods on each chain is shown at the beginning of a crate-lining cycle. When the motor 91 is energized, the tension roller 82 draws the paper from the supply roll 40 and moves it over a guide plate 278 into position between the rollers UR2 and LR2, as seen in Fig. 13. It will be noted that, in this position, the switches SW14 and SW16 are in their normal open position and that a switch actuator 249 is disposed on the chain 179 ahead of the roller UR1. In Fig. 14 the paper has been advanced completely across the machine. The drive mechanism of the conveyor and the feed rollers is so arranged that the velocity of the carrier rods is greater than the feeding velocity of the liner. Therefore, as the liner is drawn across the machine, the rods roll over the liner as they gradually pull ahead. When the position of Fig. 14 is reached, the leading portion of the liner has been released by the rods UR2, LR2 and UR3, LR3. Also at this position, the switch actuator 249 has contacted the rocker 252 of switch SW14 and moved the electric contacts of the switch to closed position. As will be explained in connection with the control diagram of the entire machine, the closing of switch SW14 de-energizes the electric motor 91 which drives the tension roller 82 and the conveyor 35. Referring to the left side of Fig. 14, it will be noted that the leading carrier rods UR1 and LR1 of the groups of rods at that end are about to converge and grip the trailing portion of the paper. After the motor 91 has been de-energized, the conveyor chains 179 and 216 coast a short distance and, as a result, the switch actuator 249 closes the switch SW16 to effect the cutting stroke of the knife 133. By the time the switch actuator 249 contacts the switch SW16 the rods UR1 and LR1 at the left hand end of the conveyor have gripped the paper. At the right hand end the paper is gripped by rods UR6 and LR6. Since these four rods, UR1 and LR1 at the left and UR6 and LR6 at the right, retain the paper during the cutting stroke and yieldingly rotate to release the paper as the crate is elevated into contact with the paper, as seen in Fig. 15, the rods UR1 and UR6 of each group of rods are equipped with plastic bands 280 (Fig. 10) to provide effective gripping of the paper.

As previously mentioned, after the paper feeding mechanisms 30 and 32 draw the paper lengths P1 and P2 across the machine, the hoist 50 elevates an empty crate C which has been positioned on the hoist beneath the central zone 45. The supporting base 64 (Fig. 17) in which the hoist is mounted comprises a pair of spaced base plates 282 on each of which an upright side wall member 283 is welded. Near their lower ends, the side wall members 283 are connected by two spaced apart transverse channels 285 which have downwardly extending flanges welded to the side wall members 283 and to the base plates 282. Near their upper ends the side wall members 283 are connected by cross braces 286 and 287 which are welded to rigid straps 289 and 290 and lateral support bars 291 and 292. A channel 294 is welded across the upper surfaces of the channels 285, the spaced side flanges 295 of the channel 294 being arranged to provide a socket in which a support block 296 is welded. A power cylinder 298 of the hoist 50 is supported in the block and extends upwardly therefrom. At its upper end, the power cylinder 298 has a stuffing box housing 300 (Fig. 18) in which the piston rod 301 of the power cylinder 298 is slidably disposed. A plate 302 (Fig. 18) is secured to the upper end surface of the piston rod 301 and to two spaced frame members 304 and 305 (Fig. 20) of a crate supporting table 306 which is arranged to be raised and lowered by the hoist 50. Besides the frame members 304 and 305, the table 306 includes four rigid side bars 308, 309, 310 and 311, all welded together to form the table 306 having an upper, flat support surface. The table 306 has a flat guide bar 312 (Figs. 20 and 26) at each end secured to the side bars 308 and 310 and extending downwardly therefrom between rollers 313 (Fig. 20) rotatably mounted on pins 314 (Fig. 17) projecting inwardly from the cross braces 286 and 287 of the base 64. As the crate C is elevated, the guide bars 312 hold the table in vertical alignment.

Each unlined crate C is fed into the machine at the front end, indicated in Fig. 20 by reference numeral 315. The crate is carried across the machine by a pair of spaced conveyor chains 317 and 318, each chain being trained around idler sprockets 319 and 320 (Fig. 26) rotatably journalled on stub shafts 321 (Fig. 20) projecting from the side faces of spaced mounting plates 323 and 324 (Fig. 26) which are secured to the top surface of each of the support bars 291 and 292. Each of the chains 317 and 318 is guided on a track 326 (Fig. 26) which is supported between the mounting plates 323 and 324 and each chain is trained around a drive sprocket 328 (Fig. 26) that is keyed to a drive shaft 330 journalled in bearings 331 and 332 (Fig. 20) mounted on the support bars 291 and 292. An extension 334 (Fig. 21) of the shaft 330 carries a sheave 335 which is driven through a belt 336 from a sheave 337 keyed to a take-off shaft 338 (Fig. 20) of a speed changer 339. The speed changer is driven from a motor 340 by means of a belt 341 trained around a sheave 342 keyed to a shaft 343 of the speed changer 339 and a double sheave 345 keyed to the motor shaft 346. It will be noted in Fig. 18 that the upper surfaces of the chains 317 and 318 are at a higher elevation than the top surfaces of the members 309 and 311 of the table when the table is in its lowered position. Therefore, the crate will be supported on the chains 317 and 318 until the hoist moves the table upwardly to lift the crate off the chains.

The guide frame 52 (Fig. 26) into which the crate C is lifted by the hoist comprises four flat vertical wall members 347 secured together on four vertical corner posts 348 (Figs. 26 and 2) to form a box-like structure open at the top and bottom.

Each wall member has a rounded bottom edge 349 and flanged side edges 350 which are secured to the corner posts 348 by screws 351. The corner posts 348 (Fig. 26) are supported in depending relation from overhead angle bars 352 secured between the frame members 62.

The former 53 (Fig. 5) is a closed cubical member proportioned to fit inside the crate C. Four spaced studs 353 (Figs. 5 and 26) project upwardly from the top wall 354 of the former through apertures (not shown) in angle bars 355 which are secured between the frame members 62. A spring 356 is disposed around each stud 353 between the top wall 354 of the former and a collar 357 loosely disposed on the stud 353 below the angle bar 355. The inserting of the liners into the crate is accomplished when the crate bottom contacts the bottom of the former and lifts the former against the compression of the springs 356. Two upper edges of the crate C then contact sponge rubber bumpers 358 (Fig. 5) each of which is secured to a rigid backing member 359 that is secured to spacer blocks 357 carried by the angle bars 355 (Fig. 26) by bolts 360. The other two upper edges of the crate contact sponge rubber bumpers 361 (Fig. 26) secured to the bottom face of support bars 362 which are mounted betwen frame members 62. The action of the upper edges of the crate in pressing the liners into the sponge rubber bumpers 358 and 361 creases the liner securely over the edges of the crate to hold the free ends against the sides of the crate, thereby preventing them from swinging out as the crate descends.

In the present invention, the hoist mechanism and the paper feeding and cutting mechanism are each operated by a separate hydraulic system. Liquid under pressure is supplied to both systems by a double pump P (Fig. 25) mounted inside a closed, sheet metal tank 363 which is secured on the channels 285 (Fig. 21) on the opposite side of the hoist power cylinder from the electric motor 340. The pump P has a first pumping unit 364 (Fig. 25) arranged to deliver liquid to the hydraulic control of the hoist, and a second pumping unit 365 arranged to deliver liquid to the hydraulic control system for the paper feeding and cutting mechanisms. The pumping units 364 and 365 have a common drive shaft 366 (Fig. 21) which extends through the wall of the tank and is driven by a belt 367 disposed between a pulley 368 keyed to the pump shaft 366 and the pulley 345 keyed to the drive shaft 346 of the electric motor 340.

*Hoist control system*

The pumping unit 364 which is arranged to supply liquid under pressure to the lower end of the hoist 50, has a screened inlet connection 371 (Fig. 25) and a discharge 372 which is arranged to deliver pressurized liquid to a control valve 373 (Fig. 24) mounted inside the tank 363. The valve 373 has an elongated housing 374 provided with a transverse passage 375 (Fig. 24) extending therethrough, by means of which liquid delivered to the housing may pass directly through and be directed to a line 376 (Fig. 25) leading to the lower end of the power cylinder of the hoist. The valve housing 374 also has a by-pass connection 377 which is arranged to direct liquid from a generally cylindrical bore 378 of the housing back to the tank 363, which also acts as a reservoir. The bore 378 communicates with the through passage 375 by means of a short passage 379. A plunger 380 is disposed in the bore 378 and has a pair of spaced cylindrical valving elements 381 and 382 arranged to control the by-passing of liquid through the valve bore to the reservoir. A rod 383, attached to the lower end of the plunger, extends through an opening 384 in the housing and carries a button 385 at its lower end. A spring 386 disposed between the button 385 and the housing 374 urges the plunger 380 toward a position wherein the valving element 381 covers the passage 379 preventing the by-passing of liquid. Thus, the valve is continuously urged toward a lower position that will permit liquid under pressure to be delivered to the hoist to raise it. However, the valve is held in an upper position, wherein the valving element 381 is removed from the passage 379 by means of a rod 387 connected to the top end of the plunger 380. The rod 387 extends through the open upper end of the valve housing and through a packing 388 mounted in the top wall of the tank 363. The upper end of the rod 387 is connected to a chain 389 (Fig. 27) which in turn is connected to an arm 390 keyed to a shaft 391. As seen in Fig. 27, the shaft 391 is rotatably journalled in blocks 392 secured to the opposite sidewalls 283 of the base 64 and the arm 390 is so located on the shaft 391 that the chain 389 is directly above the packing assembly 388 in the top wall of the tank 363. It will be evident from Fig. 27 that the spring 386 at the lower end of the valve 373 tends to pull the plunger 380 downwardly and rotate the valve control shaft 391 in the counterclockwise direction indicated by the arrow 394 (Fig. 27). A wheel-like member 395 keyed to the shaft 391 has a latch detent 396 (Fig. 23) arranged to receive a latch bar 397, which extends radially from a second shaft 398. At one end the shaft 398 is rotatably journalled in a block 399 (Fig. 27) secured to a sidewall member 283 and at the other end it is journalled in the support bar 292. A spring 400 (Fig. 27), connected between the frame member 287 and a tab 401 secured to the shaft 398, urges the shaft 398 in a clockwise direction. When the latch bar 397 is engaged in the detent 396 of the wheel 395, valve control shaft 391 cannot be rotated in the counterclockwise direction and the valve plunger 380 is locked in the liquid-bypassing position. The latch bar may be released by means of a solenoid SOL. #3 (Fig. 27) which has a core 404 secured to a rod 405 pivotally connected at 406 to a lever 407 secured to the shaft 398. When the solenoid SOL. #3 is energized the core is pulled downwardly into the solenoid housing causing the shaft 398 to be rotated in a counterclockwise direction to swing the latchbar out of the detent 396. The valve control shaft 391 is then free to rotate under the pull of the valve spring 386 and the plunger 380 is moved to a position covering the passage 379. The pressurized liquid passing through the valve is then directed to the power cylinder of the hoist to begin the upward movement of the crate C. Therefore, when the valve control shaft 391 is unlatched by the energization of the solenoid SOL. #3, the upward movement of the hoist is begun.

Since the hoist should not be elevated until a crate is in correct position on the hoist table, provision is made in the present invention for effecting the energization of the solenoid SOL. #3 coincident with the arrival of the crate in the correct position. In Fig. 18 it will be noted that the hoist table 306 is of such a width that the side edges of the crate to be lined will be directly above the side bars 309 and 311 of the table. A pair of upstanding plates 409 (Figs. 18 and 20) project above the table, one plate being secured to each side bar. These guide plates center the crate as it is moved toward the rear of the machine by the conveyor chains 317 and 318. As the crate approaches the desired position, the leading face of the crate contacts two spaced levers 411 (Fig. 27). Each lever 411 comprises a rigid plate 412 (Fig. 28) rotatably journalled on a bolt 413 (Fig. 29) which is threaded into a tapped hole 414 in a block 415. The block 415 has a cylindrical aperture 416 through which a shaft 417 extends. A setscrew 419 (Fig. 27) locks the block 415 on the shaft 417 which is rotatably supported in tabs 420 and 421 extending downwardly from the support bars 291 and 292, respectively. Each lever 411 has a flat elongated rigid arm 424 (Fig. 28) disposed in a recess 425 (Fig. 29) formed in the plate 412. A stud 426, integrally formed on the plate 412, extends laterally from the plate through an opening 428 in the arm 424. A spring 430, disposed between the arm 424 and a washer 431 on the outer end of the stud, normally urges the rigid arm 424 of the lever against the plate 412. A second stud 433, integrally formed on the plate 412 extends through a second opening 434 in the arm 424 and carries a lock nut 435 at its outer free end to limit the outward pivoting of the arm. Each lever arm 424 has a curved upper end 437 overlying one of the support bars 291 and 292. A roller 438 is rotatably mounted on each end portion 437. When the crate C approaches the desired rearward position, it contacts the levers 411 and pivots them rearwardly. A tab 439 (Fig. 27) secured to each lever, engages an arm 440 of a normally open electric switch SW8 and pivots the arm rearwardly to close the electric contacts of the switch. Pins 441 projecting laterally from the support bars 291 and 292 limit the pivoting movement of the levers 411. The two switches SW8 are connected in the control circuit so that, when they are closed by the contact of the crate with the levers, the solenoid SOL. #3 will be energized and the hoist will start to elevate the crate.

As the hoist moves upwardly, the crate is lifted off the conveyor chains 317 and 318 and the levers 411 are swung away from the crate as shown in Figs. 19 and 26. Each shaft 417 has a lever 442 (Fig. 18) keyed thereon. The lever 442 carries a roller 443 which rests on a rigid cross bar 444 when the hoist is in its lowered position illustrated in Fig. 18. As the hoist moves upwardly, a spring 445 disposed around a pin 446 and between the lever 442 and a fixed arm 447 secured to the table 306, urges the lever 442 downwardly (Fig. 19). The levers and the springs are so arranged on each side of the table that the two shafts 417 will be rotated in opposite directions and the levers 411 which are keyed to the shafts will be swung away from the crate. While each lever 411 is held in the swung-out position, a spring 448 (Fig. 27) disposed between the lever 411 and the support bar 292 draws the lever forwardly to the position indicated in Fig. 26. After the crate has been lined and the hoist moves downwardly, the levers 442 contact the rigid cross bars 444 and swing the levers 411 back upwardly toward the sides of the crate. Since the rigid plate 412 (Fig. 28) of each lever is journalled on the bolt 413 of the block 415, it will swing all the way against the block. However, since the upright arm 424 on each lever is resiliently connected to the plate 412, it will be swung inwardly only to the point where the roller 438 contacts the side of the crate. When the lined crate comes to rest on the continuously moving conveyor chains 317 and 318, it is discharged out through the rear of the machine onto a suitable table or to a conveyor. The rollers 438 on the top of the lever arms 424 roll along the side of the crate as the crate is discharged. When the crate moves out of contact with the rollers, the springs 439 (Fig. 28) in the lever 411 pivot the arms 424 of the levers into upright position with the rollers 438 disposed above the support bars 291 and 292 to intercept the next crate moved into the machine by the conveyor chains.

It is necessary that the latch mechanism 397 (Fig. 27) which was released by the energization of the solenoid SOL. #3, be reset so that the valve can be moved to by-passing position to permit the hoist 50 to descend by gravity after the paper has been pressed into the crate. To reset the latch 397, the solenoid is first de-energized by opening an electric switch SW5 (Figs. 18 and 27) which is connected in the control circuit of the solenoid. When the hoist is in the lower position of Fig. 18, the switch is held closed by a cam plate 449 secured to the table and projecting outwardly therefrom to contact an arm 450 of the switch SW5. When the hoist moves upwardly, as shown in Fig. 19, the cam plate 449 moves out of contact with the arm permitting it to be moved by a spring (not shown), disposed inside the switch, to an open position to de-energize the solenoid SOL. #3. When the solenoid SOL. #3 is de-energized, the spring 400 (Fig. 23) connected between the valve control shaft 398 and the frame member 287, will rotate the shaft 398 clockwise swinging the latch bar 397 upwardly against the peripheral surface of the wheel 395. The valve plunger 380 cannot be moved to by-pass position, however, until the shaft 391 is rotated in a clockwise direction (Fig. 27). Clockwise rotation of the shaft 391 is accomplished by a vertically movable rod 451 (Figs. 22 and 27) which is adjustably secured at its upper end to a bracket 452 (Fig. 27) mounted on a support bar of the table 306. The rod 451 telescopes a tubular member 453 which is mounted for vertical sliding movement in brackets 454 and 452 extending laterally from a vertical support plate 455 that is secured at its lower end to one flange of the transverse channel 294. The rod 451 carries an abutment member (not shown) which is arranged to contact a stop pin (not shown) mounted on the inside of the tubular member 453 when the hoist 50 reaches a predetermined height. As the hoist continues upwardly the tubular member 453 is moved upwardly also, carrying with it an upright pin 457 (Fig. 26) mounted on an arm 458 extending laterally from the tubular member 453. An apertured support arm 460, which is secured to the tubular member 453 is moved upwardly also to compress a spring 462 disposed around a guide rod 463 which extends through the aperture in the support arm 460 and is provided with a forked upper end 465 (Fig. 27) which pivotally receives a latch bar 466. The spring 462 is disposed between the support arm 460 and a collar 468 formed on the forked end of the rod 463 and tends to transmit the upward movement of the support arm 460 to the latch bar 466. The latch bar 466, however, has one end pivotally mounted on a support member 470 rigidly secured to a U-shaped bracket 471 (Fig. 24) which is attached to the vertical support plate 455. When the hoist table 306 is in the lowered position of Fig. 22, the outer free end of the latch bar 466 is engaged in a latch detent 472 in a plate 473 which is pivotally mounted on a spacer pin 474 extending outwardly from the U-shaped plate 471. When the latch bar 466 is engaged in the detent, the spring 462 cannot pivot the latch bar 466 upwardly and as a result the spring 462 is compressed when the tubular member 453 begins its upward movement with the table. Just as the table reaches its upper position, the upstanding pin 457 carried by the tubular member 453 contacts an abutment shoulder 476 formed on the plate 473 causing the plate 473 to be pivoted in a clockwise direction (Fig. 26) releasing the latch bar 466. The compressed spring 462 immediately moves the rod 463 upwardly effecting an upward pivoting movement of the latch bar 466. A pushrod 478, disposed above the latch bar 466, has a lower end portion 479 slidably disposed in an aperture in a plate 480 (Fig. 26) formed on the top surface of the latch bar 466 and an upper end portion 481 slidably disposed in an aperture in an actuating arm 483 (Fig. 27) that extends radially outwardly from a hub 484 keyed to the shaft 391. A first collar 486 is fastened by setscrews (not shown) on the pushrod 478 immediately above the latch bar plate 480 and a second collar 487 is similarly secured to the pushrod 478 immediately below the actuating arm 483. When the latchbar 466 is released from the detent 472 and the compressed spring 462 pivots the latch bar upwardly, the shaft 391 is rotated in a clockwise direction (Fig. 26) through the upward movement of the pushrod 478 acting on the radially extending actuating arm 483. When the shaft has been rotated to bring the wheel 395 to the positon indicated in Fig. 26, the spring 400 rotates the shaft 398 and moves the latch bar 397 into position against the detent 396 and also moves the core 404 of the de-energized solenoid SOL. #3 upwardly out of the solenoid housing. The clockwise rotation of the shaft 391 swings the arm 390 upwardly which, in turn, lifts the valve plunger 380 (Fig. 27) upwardly to open the by-pass connection in the valve 373 and permit the pressurized liquid in the power cylinder to be forced back through the valve into the reservoir as the hoist descends by gravity.

Since the raising and lowering cycle of the hoist is begun by unlatching the shaft 391 so that the spring 386 of the valve can rotate the shaft counterclockwise (Fig. 27) to open the valve and direct fluid to the power cylinder of the hoist, the entire machine can be locked by locking the shaft 391 against counterclockwise rotation. This is accomplished by means of a vertically disposed rod 490 (Fig. 27) that extends through a slot in a control arm 491 integrally formed on a hub 492 that is keyed to the shaft 391. An abutment member 494 is secured to the rod 490 above the control arm 491, and a forked member 496 is secured to the lower end of the rod 490. A shaft 497 is journalled for rotation in blocks 498 adapted to be secured to frame members of the machine and carries a foot pedal 499 keyed thereto. An arm 501 is secured at one end to a hub 502 keyed to the shaft 497 and at the other end is pivotally connected in the forked end 496 of the rod 490. The rod 490 is held in the locked position of Fig. 27 by a spring 503 disposed between a collar 505 fixed on the rod 490 and a rigid bracket 507 secured in stationary position on the machine. It will be evident that the abutment member 494 on the rod will prevent counterclockwise pivoting of the shaft 391 until the operator depresses the foot pedal 499 and thereby raises the abutment member.

In summary, the hoist control system provides means for latching the valve 373 in a position wherein pressurized liquid is continuously by-passed back to the reservoir 363, means for unlatching the valve when the unlined crate reaches a predetermined position on the hoist table to direct pressurized liquid to the power cylinder of the hoist, and means responsive to upward movement of the hoist table for resetting the latch and moving the valve to by-pass position after the table has reached the desired height to permit the table to descend under its own weight.

*Paper cutting control system*

The second pumping unit 365 of the double pump P has a discharge line 510 (Fig. 25) which delivers liquid under pressure to an electrically operated, four-way, three position, open center hydraulic valve 512 which is mounted on the outer wall of the tank 363. The valve 512 and its various connections to the pumping unit P, to the reservoir 363, and to the hydraulic cylinders 154 which control the raising and lowering of the knives 133 are shown schematically in Figs. 30, 31 and 32. In Fig. 30 the position of the valve is illustrated when the knives are held in their upper position preceding or following a cutting stroke. The discharge line 510 from the pumping unit 365 has a first branch 514 discharging into a central cylindrical chamber 515 in the valve housing and a second branch 516 leading to a central cross passage 517 in an end portion 518 of the valve housing. A main control piston 519 is slidably disposed in the chamber 515 and, in Fig. 30, is held in a centered position, by springs 520 and 521, wherein a longitudinal bore 523 of the piston 519 is in communication with the supply branch 514 through a lateral passage 525 and in communication through lateral passages 526 and 527 with a conduit 528 leading to the tank 363. The piston 519 has an elongated recess 530 in one wall in registry with a conduit 532 which communicates with a chamber 533 at one end of each knife-lifting power cylinder 154 on one side of the piston therein. A conduit 535, which communicates with a chamber 534 of each power cylinder at the opposite side of the piston is in registry with a second elongated recess 537 in the piston 519. A rod 540 extends longitudinally from one end of the piston 519 through a wall 541 in the housing into a cylindrical chamber 542. A piston 543 secured to the rod 540 is slidably disposed in the chamber 542. A passage 544 communicates one end of the chamber 542 with a cylindrical control chamber 546 while a passage 547 communicates the other end of the chamber with a cylindrical chamber 548. The two chambers 546 and 548 are connected to each other by a cross-passage 549 and by the cross passage 517. A conduit 550 communicates the cross passage 517 with the tank 363. A plunger 552 (Fig. 31) which is connected at one end to the end of the core of solenoid SOL. #2 has two spaced cylindrical members 554 and 555 slidably disposed in the chamber 546. A spring 556 urges the plunger 552 into the position shown in Fig. 30 when the solenoid SOL. #2 is de-energized. A plunger 558, which is connected at one end to the core of solenoid SOL. #1 has two spaced cylindrical members 559 and 560 slidably disposed in the chamber 548. A spring 561 urges the plunger 558 into the position shown in Fig. 30. Therefore, Fig. 30 represents a position of the valve wherein the liquid in the first discharge branch 514 of the pump is directed through the valve housing back to the tank 363 while the flow of the liquid in the second discharge branch 516 is stopped by the cylindrical members 555 and 560 which block off the central cross passage 517. Liquid is trapped in both conduits 532 and 535 leading to the hydraulic power cylinders 154 and therefore the knives 133 are held in their raised positions.

In Fig. 31 the position of the valve 519 is shown after the solenoid SOL. #1 has been energized during the operating cycle of the machine. When the solenoid SOL. #1 is energized the plunger 558 is forced downwardly against the resistance of the spring 561 until the member 559 blocks off the cross-passage 549 and the pressure branch 516 is communicated with the chamber 548 through the cross passage 517. With this setting the chamber 542 on one side of the piston 543 is vented to the tank 363 and, as a result, the piston 543 is moved to the left as seen in Fig. 31. Correspondingly, the main piston 519 is also moved to the left and the pressure chambers 533 of the power cylinders 154 on the left side of the pistons 565 therein are connected to the tank through the conduit 532, and the passages 525, 523, and 527 in the piston 519. At the same time the pressure chambers 533 on the right side of the pistons 565 are connected to the first pressure branch 514 through the elongated recess 537 and the conduit 535. The pistons 565 therefore are forced to the left causing the piston rod 153 (Fig. 8) to be moved out of the cylinder and the knife 133 lowered through the bellcrank 143.

When each knife 133 descends it closes switch SW10 (Fig. 8) which de-energizes solenoid SOL. #1 and energizes solenoid SOL. #2 to effect the return elevation of the knife. When the solenoid SOL. #1 is de-energized and the solenoid SOL. #2 is energized, the valve assumes the position indicated in Fig. 32 wherein the plunger 552 has been forced downwardly to block off the cross-passage 549 and to communicate the chamber 542 on the left side of the piston 543 with the second pressure branch 516. The plunger 558 has been forced upwardly so that the chamber 542 on the right side of the piston 543 is vented to the tank 363. The piston 543 is therefore moved to the right (Fig. 32) pushing the main piston 519 to the right also. The power cylinder chambers 534 on the right side of the pistons 565 are vented to the tank while the chambers 533 on the left side of the pistons 565 are connected to the first pressure branch 514. Accordingly, the pistons 565 are pushed to the right in the power cylinders and the piston rods 153 (Fig. 8) are moved into the cylinder causing the knives to be raised through the bellcranks 143. When each knife 133 reaches the upper limit of its travel it contacts the switch SW12 and moves it to open position thereby de-energizing solenoid SOL. #2. With both solenoids SOL. #1 and SOL. #2 de-energized, the main piston 519 will be moved to the centered position of Fig. 30 by the springs 520 and 521. Liquid will be trapped in both conduits 532 and 535 and the knives will be held in raised position.

*Operation*

A normal cycle of operation of the crate lining machine of the present invention will be explained with reference to the control diagram illustrated in Fig. 33. Such a normal cycle includes the following sequence of operations: (1) feeding the paper lengths across the machine; (2) stopping the paper lengths in predetermined position; (3) lowering the knives to cut off the required lengths; (4) raising the knives; (5) locking the knives in raised position; (6) moving an unlined crate into position under the overlapping paper lengths; (7) elevating the crate on the hoist table; and (8) lowering the lined crate. In the control diagram, switches will be indicated by the reference letters SW, and relays will be indicated by a capital R followed by a specific relay letter, for example, RA indicates relay A, RB indicates relay B. The contacts of the various relays are disposed in various circuits and they will be indicated by the reference letters of the relay followed by a numeral, for example, RA1 indicates contacts #1 of relay A and RA2 indicates contacts #2 of relay A. Further, in Fig. 33 the switches, the relays, and the relay contacts are shown in full lines in the position, either open or closed, which they assume at the beginning of a cycle with the machine completely deactivated. The dotted line showing of these members indicates the position into which they are moved during the cycle.

Feeding the paper across the machine. The feed motor 91 which drives the endless chain paper conveyors 35 through the various pulleys, as described previously, is started by manually closing the normally open switches SW4 and SW15. The closing of switch SW4 energizes relay RC causing contacts RC1 to close and energize motor starter relay RA. When the contacts RA1, RA2, and RA3 are closed, the feed motor 91 is energized and a solenoid-controlled brake 570 is released. The motor 91 then starts to drive the endless chain conveyors 35 and 35a and the opposed carrier rods R on the conveyors draw the sheets off the supply rolls 90 and across the machine.

Stopping the paper lengths P1 and P2 in predetermined position. When each sheet of paper has been extended to the desired position, a switch actuator 249 on the endless chain 179 contacts the switch SW14 closing it and energizing relay RD. Normally closed relay contacts RD1 in the feed motor circuit are opened. The opening of contacts RD1 opens the energizing path of relay RA to de-energize the relay RA. The de-energization of relay RA opens contacts RA1, RA2, RA3 to open the energizing circuit of motor 91. The solenoid brake 570 is applied by spring pressure, and the motor 91 stops.

Lowering the knives. The pump motor 340 is started by closing normally open manual switch SW2 which causes relay RB to be energized and contacts RB1, RB2, and RB3 to be closed. As previously explained, when the solenoid SOL. #1 is energized, fluid under pressure is directed through pressure branch 514 to the power cylinders 154 of each knife resulting in each knife being forced downwardly to cut off the paper length. In the control diagram (Fig. 33) it will be seen that, in the circuit of SOL. #1 the contacts RF1 were already closed when the manual closing of switch SW4 completed the energizing path of relay RA, which in turn closed contacts RA4 to operate relay RF. Also, the contacts RD3 were closed when switch actuator 249 closed switch SW14 and energized relay RD. Solenoid SOL. #1 will be energized when the actuator 249, after momentarily closing switch SW14 coasts to a stopped position holding switch SW16 in closed position. The switch actuator 249 therefore first stops the paper feeding endless chain conveyors 35 and then shortly thereafter causing the cutting knives 133 to be lowered.

Raising the knives. When the solenoid SOL. #1 is de-energized and the solenoid SOL. #2 is energized, fluid under pressure will be directed to the power cylinders 143 to raise the knives through the bellcrank mechanisms. In its downstroke, each knife moves away from a switch SW12 allowing it to close, and then the knife contacts a switch SW10 closing it. Relay RE is then energized and contacts RE1 in the circuit of solenoid SOL. #1 are opened de-energizing the solenoid. Contacts RE2 in the circuit of solenoid SOL. #2 are closed by the energization of RE, effecting the energization of solenoid SOL. #2 and the raising of the knives.

Locking the knives in raised position. When the knives are raised, switches SW10 and SW12 are opened, relay RE is de-energized and contacts RE2 are opened, breaking the circuit of solenoid SOL. #2. With both solenoid SOL. #1 and SOL. #2 de-energized, the main piston 519 (Fig. 30) is moved to the central position and the knives are locked in the raised position.

Moving an unlined crate into position under the overlapping lengths of paper. This is accomplished simply by placing the box on the end of the conveyor chains 317 and 318 at the inlet side 315 of the machine (Fig. 1). The crate C is carried across the machine by the conveyor chains until it abuts the levers 411 and pivots them rearwardly against the stop pins 443 which arrests the pivoting movement of the levers and stops the crate in the desired position.

Elevating the hoist table to raise the crate. To ready the hoist for elevating the crate, the operator depresses the foot pedal 499 to release the valve control shaft 391. Then, the hoist will be moved upwardly when the solenoid SOL. #3 is energized to unlatch the latch bar 397 that keeps the valve plunger 380 of the valve 373 in the by-pass position. Referring to the control circuit which includes the solenoid SOL. #3, it will be noted that the contacts RG1 were closed as a result of the energization of relay RG when the knife closed switches SW10 and SW12 to energize relay RG by completing an energizing path to relay RE to close contacts RE3. Similarly, contacts RD4 were closed when switch actuators 249 closed switch SW14 to energize relay RD. Now, when the crate C pivots the levers 411 rearwardly and closes the switch SW8, the circuit through the solenoid SOL. #3 will be completed and the solenoid will be energized. When the valve 373 has been actuated to cause fluid to raise the hoist and the hoist begins its upward movement, the switch SW5 (Fig. 8) will be opened causing the relay RD to be de-energized. In this manner, the contacts RD4 in the circuit of solenoid #3 will be opened and the solenoid will be de-energized to permit the valve control shaft 391 to be rotated by the rising table to reset the valve 373 in by-passing position. It will be noted also that opening of switch SW5 insures that the paper feed motor will not feed paper across the machine while the hoist is moving. When the valve has been reset, the table descends by gravity onto the chain conveyor which carries it to the rear of the machine for discharge therefrom.

Referring to the control circuit of the solenoid SOL. #3 near the bottom of Fig. 33, it will be evident that to energize SOL. #3, the crate C must close the switches SW8, the switch actuator 249 on the paper conveyor chain 179 must close SW14 and close contacts RD4, and the knives must close switches SW10 and SW12 to close contacts RG1 through relays RE and RG. Therefore, even if the crate closes switches SW8, the hoist will not start upwardly until paper is positioned above the crate and severed into desired lengths by the knives.

In Fig. 34 an alternate paper feeding and tensioning arrangement is shown. With this arrangement the chain 101 (Fig. 7) is removed from the sprockets 102 and 103 and the chain 97 is removed from the sprockets 98 and 99. A chain 580 (Fig. 34) is then trained around the sprockets 98, 99 and around an idler sprocket 581, rotatably mounted on the shaft 76, in the manner shown in Fig. 34. The paper P3 is threaded under the roll 73 and up over the tension roll 82. When the shaft 83 is rotated in a clockwise direction by the motor 91, the roll 73 will be rotated in a counterclockwise direction while the idler roll 74 will also rotate in a counterclockwise direction. The threading arrangement of Fig. 34 is particularly effective when paper having a tendency to curl is being used since the travel of the paper under the roll 73 will remove the curl. When a relatively rigid lining material such as aluminum foil is used, the threading arrangement of Fig. 12 is satisfactory.

While the crate-lining machine has been described in connection with the lining of a container with a length of paper, it is to be understood that any flexible material that is supplied in roll form can be used in this machine. Particularly satisfactory results have been obtained when aluminum foil is used as the lining material.

From the foregoing description it will be apparent that the machine of the present invention is capable of automatically carrying out the complete operation of placing a liner in an unlined container. The novel use of rollers, which move with an endless chain to bring the lining material to a position over the container and then rotate relative to the chain to yielding resist the pressing of the liner into the container, provides a particularly efficient arrangement for supporting the lining material during the process. The novel control mechanisms featured in this machine assure the trouble-free, economical lining of containers.

Having thus described my invention, what I claim as new and desire to protect by Letters Patent is:

1. A machine for lining a container comprising means for supporting and positioning an open top container, means including gripping rollers for frictionally gripping a strip of flexible lining material and positioning and supporting said strip directly above the open top of the container, and means for pressing the strip into the container, the frictional grip of said gripping rollers being proportioned to apply a yielding resistance to the strip pressing operation, said gripping rollers being arranged to gradually release the grip on said strip prior to the completion of the lining operation.

2. A machine for placing a lining of flexible material in an open top container comprising a hoist, a table on said hoist adapted to receive and support an open top container, means including gripping rollers for positioning and holding a stirp of flexible lining material directly above and in the path of upward movement of the container on the table, and a former disposed above said strip of lining material and positioned and proportioned to pass inside the container as the container is elevated by said hoist, said gripping rollers being arranged to yieldingly resist the elevation of the lining material as the container carries it upwardly.

3. A machine for lining a container comprising means for supporting and positioning an open top container, means for advancing a strip of lining material into position directly over said container, means for pressing the strip of material into the container, and stationary guide means cooperating with said strip advancing means for tensioning the strip of material as it is pressed into the container.

4. A machine for placing a lining of flexible material in an open top container having a rectangular cross-section comprising a hoist having a support surface adapted to receive and position an open top container, a forming member supported directly above the container and proportioned to pass inside the container as the container is elevated by the hoist, and carrier members mounted for movement across the open top of the container at right angles to each other and having gripping rollers for positioning and holding two strips of flexible material crossing each other at right angles in the path of upward movement of the container and between the container and the forming member, whereby said strips are pressed into the container as said forming member passes inside the container, said gripping rollers being arranged to gradually release said strips as said strips are pressed into the container.

5. A machine for lining a container comprising a frame structure defining a central open work zone, a pair of spaced endless chains extending through said zone, gripping rollers carried by said conveyor arranged to engage a strip of lining material and draw it across said zone, means for severing a length of lining material from said strip, means for supporting an open top container immediately below the portion of said strip in said zone and between said spaced chains, means for elevating said supporting means to raise said container upwardly between said chains and into contact with said length of lining material, and means disposed in said zone above said length of material arranged to press said material into said container as said container is elevated, said gripping rollers being constructed to maintain a tension on said strip during the initial part of the pressing-in operation and to thereafter release said strip.

6. A machine for lining a container comprising means for supporting and positioning an open top container, an endless chain conveyor having a portion movable above said container, a roll of lining material paper mounted adjacent said conveyor, a set of gripping rods rotatably mounted on said conveyor and movable with said conveyor, said conveyor being arranged to move said gripping rods toward each other to grip a leading end portion of the roll of lining material therebetween and to draw a strip of said material across the space above said container, means for stopping said conveyor when said strip is positioned above said container, a second set of rotatable gripping rods carried by said conveyor and arranged to be moved close together to grip a portion of said strip adjacent the supply roll, means for cutting said strip of material at a point between said second set of rods and said roll, and means for pressing said severed length of lining material into said container, the movement of said lining material into said container being effective to tension said material and through said tensioned material to rotate said rods to release the end portions of said strip.

7. A machine for lining a container comprising a hoist having a support surface arranged to receive and position an open top container, a cooperating set of rotatable rollers mounted on each side of said container at a higher elevation than the open top of the container, said set of rollers being adapted to grip the end portions of a strip of lining material supported therebetween with a portion of the strip disposed above said container, a forming member mounted above said portion of the strip of material directly in line with said container and adapted to move into the container to press the strip therein as the container is elevated by the hoist, and a stationary frame member mounted in spaced relation around said former and adapted to contact the end portions of said strip as said forming member moves into the container, said rollers being rotatable to yieldingly release the end portions of the strip as said liner is pressed into said container and being arranged to release the end portions entirely after said end portions contact said stationary frame member.

8. A machine for lining a container comprising a hoist having a support surface arranged to receive and position an open top container, a cooperating set of rotatable rollers mounted on each side of said container at a higher elevation than the open top of the container, said set of rollers being adapted to grip the end portions of a strip of lining material supported therebetween, positioning an intermediate portion of the strip above said container, and a forming member mounted above said intermediate portion of the strip of material directly in line with said container, said forming member being of a size to move into the container to press the lining into the container and to pull said end portions away from said rollers upon elevation of said container by said hoist, said rollers being rotatable to release the end portions of the strip as the lining is pressed into the container.

9. A machine for lining a container comprising a support structure, means inside said structure adapted to receive and support an open top container, a first pair of endless chains mounted on said structure, said chains being disposed above said container, one on each side thereof, a rotatable rod mounted between said spaced chains for movement with said conveyor over said containers, a second pair of endless chains mounted on said structure, one of the chains of said second pair being disposed immediately below and generally parallel to each of the chains of said first pair, and a rotatable rod mounted between the chains of said second pair, said first and second pair of chains being movable in timed relation and being so positioned relative to each other that the rotatable rod carried by one pair will move into cooperating position with the rod of the other pair to grip a strip of lining material therebetween and draw it across the space above said open top container.

10. A machine for lining containers comprising means for supporting and positioning an open top container, a first endless chain conveyor disposed for movement into and across a space directly above said container, a second endless chain conveyor mounted for movement into and across said space between said container and said first conveyor, cooperating rotatable elements on said conveyors movable into close proximity with each other to grip a strip of lining material therebetween and move said strip to a position above said container as said conveyors move through said space, means for stopping said conveyors when said strip is positioned above said container, additional rotatable elements carried by said conveyors and movable into cooperating relation to grip a portion of said strip of material on the inlet side of said space, means for cutting a length from said strip of material, and means for drawing said length of material from between said rotatable elements and pressing the material into said container.

11. A machine for lining a container comprising means for supporting an open top container, a first pair of parallel endless chains extending across the space above said container, a pair of spaced carrier rods rotatably mounted between said endless chains for movement into and across said space, a second pair of parallel endless chains disposed between said first pair of chains and said container, and a pair of spaced carrier rods rotatably mounted between said second pair of endless chains, each of said rods on the first pair of chains being movable into cooperating position with one of the rods of the second pair of chains to provide two spaced sets of cooperating rods, one of said sets of cooperating rods being arranged to grip a portion of a strip of lining material on one side of the container and move it into and across the space above the open top of the container, the other set of cooperating rods being arranged to grip a trailing portion of said strip before it enters the space above the container, and means for pressing the strip of lining material into the container as it is held between said sets of cooperating rods.

12. A machine for lining a container comprising a support structure, a hoist inside said structure having a support surface adapted to receive and support an open top container, a first pair of endless chains mounted on said structure, said chains being disposed above said container one on each side thereof, a pair of spaced rotatable rods mounted between said spaced chains for movement with said conveyor over said container, a second pair of endless chains mounted on said structure, each of the chains of said second pair being disposed immediately below and generally parallel to one of the chains of said first pair, and a pair of spaced rotatable rods mounted between the chains of said second pair, said first and second pair of chains being movable in timed relation and being so positioned relative to each other that each rotatable rod carried by one pair will move into cooperating position with a rod carried by the other pair to grip a strip of lining material therebetween, one set of cooperating rods being arranged to grip the forward portion of the strip of material on one side of the container and draw it across the space above said container to the opposite side thereof, leaving an intermediate portion of said strip overlying said container, the other set of cooperating rods being arranged to grip a portion of said strip rearwardly of said intermediate portion, and means for pressing said lining material into the container as the container is elevated by said hoist.

13. A machine for lining a container comprising means for supporting an open top container, conveyor means mounted for movement across the space above the container and including a group of spaced pairs of cooperating rods, said group of pairs of rods being arranged for movement into gripping engagement with a forward portion of a strip of lining material and arranged for coaction in carrying said strip across said space to a predetermined position, a single pair of cooperating rods carried by said conveyor means and spaced rearwardly from said group of pairs, means for feeding a strip of material to said group of pairs of rods, and means for moving said cooperating pairs of rods at a linear speed in excess of the linear speed of the strip such that when said strip reaches said predetermined position only one pair of said group of pairs is in gripping engagement with said strip and said trailing pair of rods is in gripping engagement with a rearward portion of the strip.

14. In a machine for lining a container having an open top, conveyor means for positioning a strip of lining material above the open top of the container, a knife mounted adjacent to said container and having a movement arranged to cut a length of material from said strip including the portion overlying said container, a control circuit operated in response to said conveyor positioning the lining material over said container and in response to the cutting movement of said knife, and a container elevating means arranged to elevate said container in response to the operation of said control circuit.

15. In a machine for lining a container, said container having a open top and a predetermined lining position, conveyor means for positioning a strip of lining material above the open top of the container, a control circuit activated in response to said conveyor means positioning the lining material over said container, a knife mounted adjacent to said conveyor and having a cutting stroke arranged to cut a length of material from said strip including the portion overlying said container, a control circuit activated in response to said conveyor means positioning the lining material over said container, a knife mounted adjacent to said conveyor and having a cutting stroke arranged to cut a length of material from said strip including the portion overlying said container, a control circuit activated in response to the cutting stroke of said knife, a control circuit activated in response to said container occupying said predetermined lining position, a power circuit operated in response to the activation of all of said control circuits, and container elevating means arranged to elevate said container in response to the operation of said power circuit.

16. In a machine for lining a container having an open top, a conveyor for positioning a strip of lining material above the open top of the container, drive means for advancing said conveyor, a control circuit operated in response to said conveyor positioning the lining material over said container for stopping said conveyor drive means, and a container elevating means arranged to elevate said container in response to the operation of said control circuit.

17. In a machine for lining a container having an open top, a conveyor for positioning a strip of lining material above the open top of the container, drive means for advancing said conveyor, a knife mounted adjacent to said container and arranged to cut a length of material from said strip including the portion overlying said container, means for lowering said knife, and a control circuit operated in response to said conveyor positioning the lining material over said container for stopping said conveyor drive means and for actuating said knife lowering means to cause said knife to be lowered.

18. In a machine for lining a container having an open top, a conveyor for positioning a strip of lining material above the open top of the container, drive means for advancing said conveyor, a knife mounted adjacent to said container and arranged to cut a length of material from said strip including the portion overlying said container, means for lowering said knife, means for raising said knife, a control circuit operated in response to said conveyor positioning the lining material over said container for stopping said conveyor drive means and for actuating said knife lowering means to cause said knife to be lowered, and circuit means responsive to the lowering of said knife to actuate said knife raising means for raising said knife.

References Cited in the file of this patent

UNITED STATES PATENTS

| | | |
|---|---|---|
| 575,239 | Huewe et al. | Jan. 12, 1897 |
| 1,266,942 | Henderson | May 21, 1918 |
| 1,455,976 | Stevens | May 22, 1923 |
| 1,940,743 | Campbell | Dec. 26, 1933 |
| 1,965,992 | Silvay | July 10, 1934 |
| 2,039,236 | Meisel | Apr. 28, 1936 |
| 2,065,828 | Schnur | Dec. 29, 1936 |
| 2,546,372 | Pinckert | Mar. 27, 1951 |
| 2,546,476 | Schefe | Mar. 27, 1951 |
| 2,704,013 | Reynolds et al. | Mar. 15, 1955 |